US011824882B2

(12) United States Patent
Wentz

(10) Patent No.: US 11,824,882 B2
(45) Date of Patent: Nov. 21, 2023

(54) SYSTEMS, DEVICES, AND METHODS FOR DETERMINING A CONFIDENCE LEVEL ASSOCIATED WITH A DEVICE USING HEURISTICS OF TRUST

(71) Applicant: Ares Technologies, Inc., Cambridge, MA (US)

(72) Inventor: Christian Wentz, Providence, RI (US)

(73) Assignee: Ares Technologies, Inc., Cambridge, MA (US)

( * ) Notice: Subject to any disclaimer, the term of this patent is extended or adjusted under 35 U.S.C. 154(b) by 114 days.

(21) Appl. No.: 16/884,273

(22) Filed: May 27, 2020

(65) Prior Publication Data

US 2020/0296128 A1 Sep. 17, 2020

Related U.S. Application Data

(63) Continuation-in-part of application No. 16/539,566, filed on Aug. 13, 2019, now Pat. No. 11,695,783.

(60) Provisional application No. 62/718,364, filed on Aug. 13, 2018.

(51) Int. Cl.
*H04L 29/06* (2006.01)
*H04L 9/40* (2022.01)

(52) U.S. Cl.
CPC .............................. *H04L 63/1433* (2013.01)

(58) Field of Classification Search
None
See application file for complete search history.

(56) References Cited

U.S. PATENT DOCUMENTS

| | | | | |
|---|---|---|---|---|
| 7,734,280 | B2* | 6/2010 | Eastlake, III | H04W 12/06 455/410 |
| 8,312,284 | B1* | 11/2012 | Zheng | H04L 9/3297 713/178 |
| 8,467,770 | B1* | 6/2013 | Ben Ayed | G06F 21/35 455/411 |
| 9,288,217 | B2* | 3/2016 | Kirkham | H04L 63/126 |
| 9,444,701 | B2* | 9/2016 | Ioffe | H04L 43/028 |
| 9,584,517 | B1* | 2/2017 | Roth | G06F 21/602 |
| 9,607,138 | B1* | 3/2017 | Baldwin | H04W 12/06 |
| 9,749,305 | B1* | 8/2017 | Sharifi Mehr | H04L 63/1441 |

(Continued)

OTHER PUBLICATIONS

Ory Segal, Passive Fingerprints of HTTP/2 Clients, Akamai White Paper, Jun. 2017, pp. 1-10, Online.

(Continued)

*Primary Examiner* — Eleni A Shiferaw
*Assistant Examiner* — Hassan A Hussein
(74) *Attorney, Agent, or Firm* — CALDWELL INTELLECTUAL PROPERTY LAW

(57) ABSTRACT

A method of determining a confidence level associated with a device using heuristics of trust includes receiving, by an evaluating device, at least a communication from a first remote device, determining, by the evaluating device, an identity of the first remote device as a function of the at least a communication, calculating, by the evaluating device, at least a heuristic of trust as a function of the at least a communication and the identity, assigning, by the evaluating device, a first confidence level to the first remote device as a function of the at least a heuristic of trust, and assigning, by the evaluating device, an access right as a function of the first confidence level.

20 Claims, 6 Drawing Sheets

(56) References Cited

U.S. PATENT DOCUMENTS

| | | | |
|---|---|---|---|
| 9,929,743 B1* | 3/2018 | Acuña-Rohter | H03M 7/30 |
| 10,181,948 B1* | 1/2019 | Nenov | G06F 9/44505 |
| 10,187,362 B1* | 1/2019 | McClintock | H04L 63/0272 |
| 10,187,754 B1* | 1/2019 | Hansen | H04L 9/3297 |
| 10,320,569 B1* | 6/2019 | Wentz | H04L 9/3239 |
| 10,467,586 B2* | 11/2019 | Fuller | H04L 9/3247 |
| 10,721,265 B2* | 7/2020 | Tian | H04L 63/1441 |
| 10,779,162 B1* | 9/2020 | Wei | H04W 76/14 |
| 10,855,674 B1* | 12/2020 | Geusz | H04L 63/20 |
| 11,005,839 B1* | 5/2021 | Shahidzadeh | H04W 12/06 |
| 11,157,954 B1* | 10/2021 | Belanger | G06Q 30/0201 |
| 11,265,276 B2* | 3/2022 | Wetherell | H04W 72/563 |
| 11,423,153 B2* | 8/2022 | Rose | G06F 9/4406 |
| 11,423,274 B2* | 8/2022 | Van Garsse | C09D 175/04 |
| 2006/0026682 A1* | 2/2006 | Zakas | H04L 9/40 726/22 |
| 2007/0086592 A1* | 4/2007 | Ellison | H04L 9/3247 380/282 |
| 2009/0031123 A1* | 1/2009 | Kruys | H04L 41/08 713/1 |
| 2009/0271618 A1* | 10/2009 | Camenisch | G06F 21/445 713/155 |
| 2009/0300744 A1* | 12/2009 | Guo | G06F 21/34 726/7 |
| 2011/0035788 A1* | 2/2011 | White | H04L 9/3231 726/4 |
| 2011/0137789 A1* | 6/2011 | Kortina | G06Q 20/384 705/38 |
| 2011/0241899 A1* | 10/2011 | Appel | G07B 15/063 340/933 |
| 2011/0320823 A1* | 12/2011 | Saroiu | H04L 9/3247 713/189 |
| 2012/0079287 A1* | 3/2012 | Leclercq | G06F 21/575 713/192 |
| 2012/0192251 A1* | 7/2012 | Faiman | H04L 63/105 726/3 |
| 2014/0173274 A1* | 6/2014 | Chen | G06F 21/64 713/155 |
| 2014/0229738 A1* | 8/2014 | Sato | H04L 9/3297 713/178 |
| 2014/0325682 A1* | 10/2014 | Turgeman | G06F 21/316 726/29 |
| 2014/0359281 A1* | 12/2014 | Saboori | H04L 9/3268 713/156 |
| 2014/0366111 A1* | 12/2014 | Sheller | G06F 21/316 726/7 |
| 2015/0019856 A1* | 1/2015 | Kim | G06F 21/575 713/1 |
| 2015/0052352 A1* | 2/2015 | Dolev | H04L 9/3278 713/156 |
| 2015/0120679 A1* | 4/2015 | Borean | G06Q 50/01 707/690 |
| 2015/0256341 A1* | 9/2015 | Ye | H04L 9/321 713/164 |
| 2015/0363782 A1* | 12/2015 | Ronca | G06Q 20/4016 705/75 |
| 2016/0014112 A1* | 1/2016 | Gunning | H04W 4/80 713/159 |
| 2016/0065558 A1* | 3/2016 | Suresh | G06F 21/32 726/7 |
| 2016/0117673 A1* | 4/2016 | Landrok | G06Q 20/409 705/71 |
| 2016/0180343 A1* | 6/2016 | Poon | H04L 63/0861 705/44 |
| 2016/0275461 A1* | 9/2016 | Sprague | H04W 12/06 |
| 2016/0350728 A1* | 12/2016 | Melika | G06Q 20/02 |
| 2016/0381079 A1* | 12/2016 | Ben-Shalom | H04L 63/20 726/29 |
| 2017/0017808 A1* | 1/2017 | Kwong | H04L 9/3278 |
| 2017/0078304 A1* | 3/2017 | Zhou | H04L 63/205 |
| 2017/0078901 A1* | 3/2017 | Iwanaga | H04W 24/04 |
| 2017/0093902 A1* | 3/2017 | Roundy | G06F 21/554 |
| 2017/0149828 A1* | 5/2017 | Botti | H04L 63/20 |
| 2017/0161505 A1* | 6/2017 | Campagna | G06F 21/602 |
| 2017/0178093 A1* | 6/2017 | Bull | G06Q 20/227 |
| 2017/0178237 A1* | 6/2017 | Wong | G06Q 40/04 |
| 2017/0214709 A1* | 7/2017 | Maestas | H04L 63/1433 |
| 2017/0249464 A1* | 8/2017 | Maximov | G06F 21/57 |
| 2017/0357828 A1* | 12/2017 | Phillips | G06F 16/00 |
| 2018/0034642 A1* | 2/2018 | Kaehler | H04L 9/14 |
| 2018/0046918 A1* | 2/2018 | Moon | G06F 21/552 |
| 2018/0091315 A1* | 3/2018 | Singhal | G06F 12/0238 |
| 2018/0101688 A1* | 4/2018 | Zage | H04L 9/3073 |
| 2018/0157825 A1* | 6/2018 | Eksten | H04L 9/3247 |
| 2018/0240112 A1* | 8/2018 | Castinado | G06Q 20/065 |
| 2018/0248704 A1* | 8/2018 | Coode | H04L 9/0825 |
| 2018/0268146 A1* | 9/2018 | Suryanarayana | G06F 21/445 |
| 2018/0285838 A1* | 10/2018 | Franaszek | H04L 9/3236 |
| 2018/0329418 A1* | 11/2018 | Baalke | B60W 30/0956 |
| 2018/0336509 A1* | 11/2018 | Guttmann | G06F 9/505 |
| 2018/0349371 A1* | 12/2018 | Bessiere | G06F 16/489 |
| 2019/0026442 A1* | 1/2019 | Perlman | H04L 9/3247 |
| 2019/0028284 A1* | 1/2019 | Rezayee | H04L 9/14 |
| 2019/0109871 A1* | 4/2019 | Vickrey | H04L 63/1433 |
| 2019/0123898 A1* | 4/2019 | Martín Rodríguez | H04L 9/0643 |
| 2019/0173872 A1* | 6/2019 | Arora | G06Q 20/3678 |
| 2019/0239753 A1* | 8/2019 | Wentz | H01J 31/501 |
| 2019/0258804 A1* | 8/2019 | Glenn | H04L 63/1433 |
| 2019/0312734 A1* | 10/2019 | Wentz | H04L 9/0877 |
| 2019/0384917 A1* | 12/2019 | Shah | G06F 21/575 |
| 2020/0007331 A1* | 1/2020 | Wentz | G06F 1/14 |
| 2020/0029208 A1* | 1/2020 | Winoto | H04W 12/06 |
| 2020/0029209 A1* | 1/2020 | Nölscher | H04W 12/069 |
| 2020/0036515 A1* | 1/2020 | Chari | H04L 9/3239 |
| 2020/0067944 A1* | 2/2020 | Dave | H04W 12/66 |
| 2020/0076829 A1* | 3/2020 | Wentz | H04L 9/3218 |
| 2020/0112442 A1* | 4/2020 | Wentz | H04L 9/3297 |
| 2021/0155261 A1* | 5/2021 | Caccia Dominioni | B60Q 9/00 |
| 2021/0211468 A1* | 7/2021 | Griffin | H04L 63/20 |
| 2023/0006844 A1* | 1/2023 | Cohen | H04L 9/3226 |

OTHER PUBLICATIONS https://www.maxmind.com/en/home.
https://www.wsj.com/articles/SB10001424052748704679204575646704100959546.

* cited by examiner

SYSTEMS, DEVICES, AND METHODS FOR DETERMINING A CONFIDENCE LEVEL ASSOCIATED WITH A DEVICE USING HEURISTICS OF TRUST

CROSS-REFERENCE TO RELATED APPLICATIONS

This application is a continuation in part of U.S. Nonprovisional application Ser. No. 16/539,566, filed on Aug. 13, 2019 and entitled "SYSTEMS, DEVICES, AND METHODS FOR DETERMINING A CONFIDENCE LEVEL ASSOCIATED WITH A DEVICE USING HEURISTICS OF TRUST" which claims priority to U.S. Provisional Application No. 62/718,364 filed on Aug. 13, 2018 and entitled, "SYSTEMS, DEVICES, AND METHODS FOR DETERMINING A CONFIDENCE LEVEL ASSOCIATED WITH A DEVICE USING HEURISTICS OF TRUST." Each of U.S. Nonprovisional application Ser. No. 16/539,566 and U.S. Provisional Application No. 62/718,364 is incorporated herein by reference in its entirety.

FIELD OF THE INVENTION

The present invention generally relates to the field of computer security. In particular, the present invention is directed to systems, devices, and methods for determining a confidence level associated with a device using heuristics of trust.

BACKGROUND

Network security creates a fundamental clash between network communications' promise of freedom and anonymity and the need to protect privacy and against cybercrime. Onerous logon and other security requirements can mar web browsing experience to the point of discouraging use of a given platform or site altogether. On the other hand, the news is replete with stories of harassment, harmful dissemination of false information, phishing, hacking, and identity theft facilitated by the free exchange of information and lack of restraint that users cherish. This issue threatens to prevent network communication, and all the services and facilities that depend upon it, from achieving its full potential.

SUMMARY OF THE DISCLOSURE

In an aspect, a method of assigning a confidence level to a remote device as a function of temporal attributes includes receiving, at a processor coupled to a memory, at least a communication identifying a remote device. The method includes determining, by the processor, at least a temporal attribute of the at least a communication. The method includes assigning, by the processor, a first confidence level to the remote device as a function of the at least a temporal attribute.

In another aspect, a system for assigning a confidence level to a remote device as a function of temporal attributes includes an evaluating device communicatively connected to a plurality of remote devices, the evaluating device designed and configured to receive at least a communication identifying a remote device, determine at least a temporal attribute of the at least a communication, and assign a first confidence level to the remote device as a function of the at least a temporal attribute and the at least a communication.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
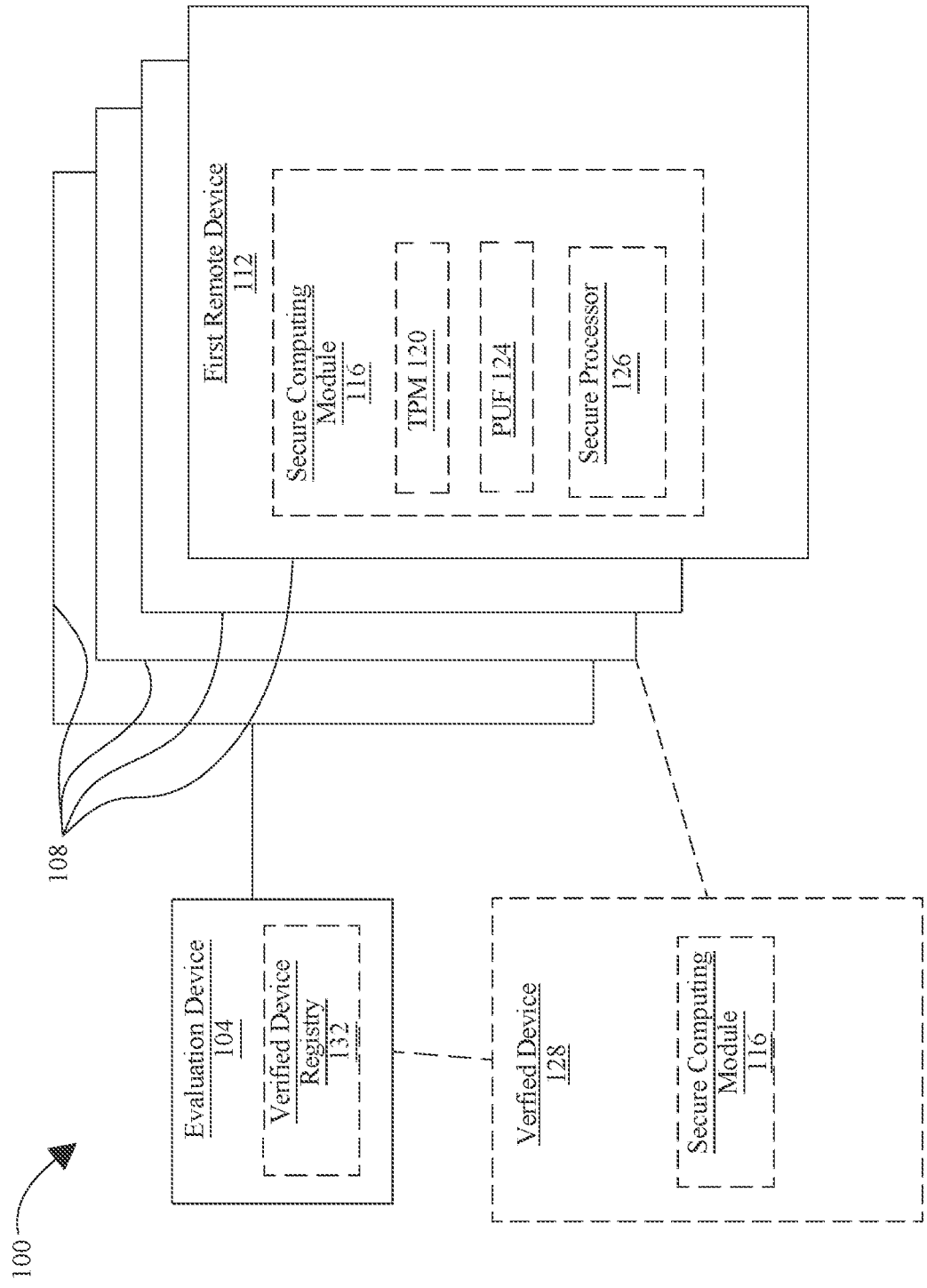
FIG. 1 is a block diagram illustrating an exemplary embodiment of a system for determining a confidence level associated with a device using heuristics of trust.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, disclosed systems and methods permit trust-based security and authentication to work on a continuum, from systems utilizing highly trusted hardware to heuristics-based systems utilizing untrusted hardware, based on user and device fingerprints including e.g. location and behavior on a network graph, transactional behaviors, association with other highly trusted nodes, direct or indirect geolocation (e.g. via GPS data or timing analysis to/from neighboring nodes on a network graph, and so forth). As a result, systems presented herein are capable of ensuring that security is as effective as necessary while remaining maximally accessible and permitting users and/or devices freedom to control security and privacy. Trustworthiness of devices or assessments of security of devices may be calculated as a function of the temporal attributes of data on which such assessments rely. Temporal attributes relevant to the calculation may include frequency of communications from which trustworthiness or safety are deduced; recency of such communications may similarly be a factor. Where a listing or data structure identifies devices to be accorded a high degree of trust, a protocol for updating or maintaining "freshness" of such a listing or data structure may be employed, to ensure that assessments of reliability regarding devices are sufficiently up to date. Assessments of reliability performed according to such protocols may in turn be recorded so as to enable protocols to repeat effectively in future iterations.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

Figure 2:
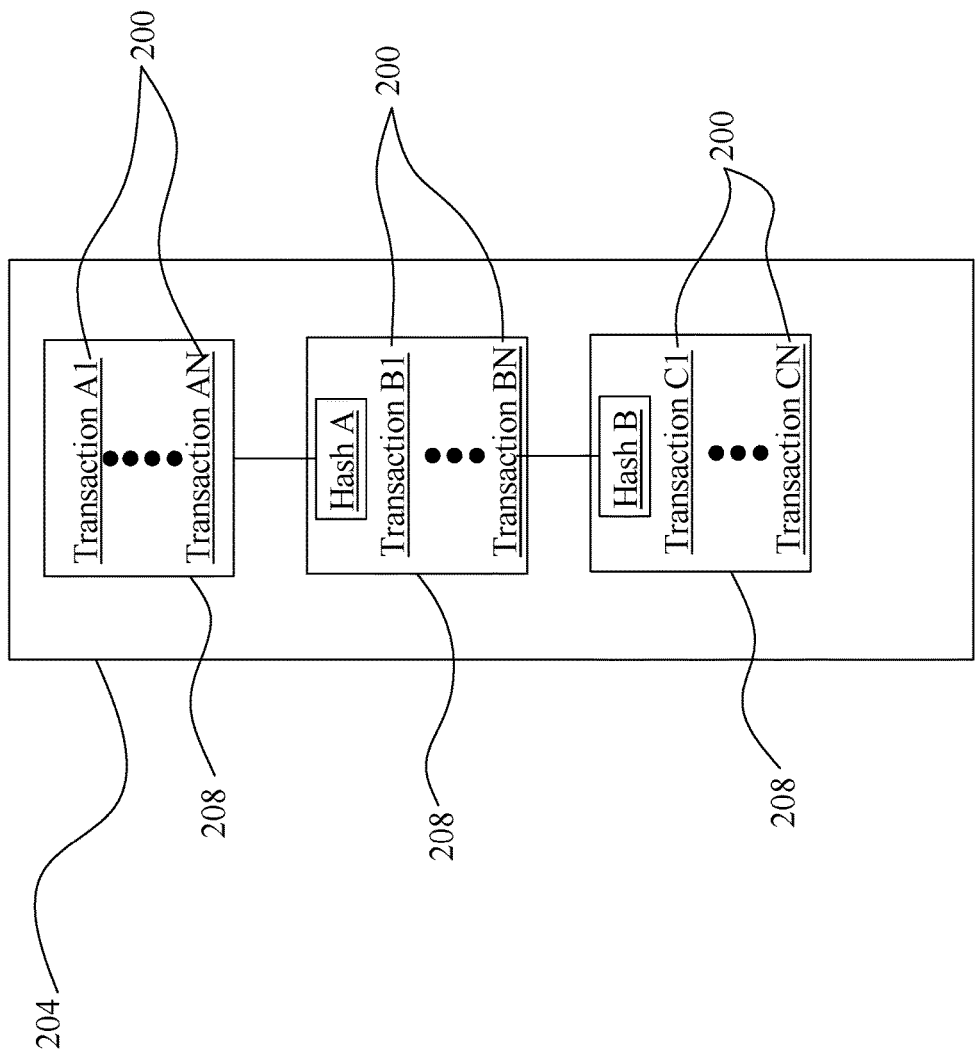
FIG. 2 is a block diagram of an exemplary embodiment of a temporally sequential listing.

In an embodiment, and continuing to refer to FIG. 2, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Provisional Application No. 62/758,367.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for determining a confidence level associated with a device using heuristics of trust is illustrated. System 100 includes an evaluating device 104. Evaluating device 104 may include any computing device as described in this disclosure, including without limitation a microcontroller, microprocessor, digital signal processor (DSP) and/or system on a chip (SoC), or a Graphic Processing Unit (GPU) as described in this disclosure. Evaluating device 104 may include, be included in, and/or communicate with a mobile device such as a mobile telephone or smartphone. Evaluating device 104 may include a single computing device operating independently, or may include two or more computing device operating in concert, in parallel, sequentially or the like; two or more computing devices may be included together in a single computing device or in two or more computing devices. Evaluating device 104 may interface with one or more additional devices as described below in further detail via a network interface device. Network interface device may be utilized for connecting an evaluating device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Evaluating device 104 may include but is not limited to, for example, an evaluating device 104 or cluster of computing devices in a first location and a second computing device or cluster of computing devices in a second location. Evaluating device 104 may include one or more computing devices dedicated to data storage, security, distribution of traffic for load balancing, and the like. Evaluating device 104 may distribute one or more computing tasks as described below across a plurality of computing devices of computing device, which may operate in parallel, in series, redundantly, or in any other manner used for distribution of tasks or memory between computing devices. Evaluating device 104 may be implemented using a "shared nothing" architecture in which data is cached at the worker, in an embodiment, this may enable scalability of system 100 and/or computing device. First processor may be an element of, be in communication with, or otherwise utilize a secure computing module as described below in further detail. First processor may be or include a cryptographic evaluator as described below in further detail.

Still referring to FIG. 1, evaluating device 104 may be communicatively connected to one or more remote devices 108. Evaluating device 104 may be designed and configured to perform any method step or steps as disclosed herein; as a non-limiting example, evaluating device 104 may be designed and configured to receive at least a communication from a first remote device 112, determine an identity of the first remote device 112 as a function of the at least a communication, calculate at least a heuristic of trust as a function of the at least a communication and the identity, and assign a first confidence level to the first remote device 112 as a function of the at least a heuristic of trust. Evaluating device 104 may include trusted hardware, including without limitation a secure computing module 116 as described below. Evaluating device 104 may alternatively have no secure computing module 116.

With continued reference to FIG. 1, one or more remote devices 108, including at least first remote device 112, may include any computing device or combination of computing devices as described in this disclosure. Any device of one or more remote devices 108 may include a secure computing module 116. As used herein, a secure computing module 116 is a hardware element configured to perform one or more secured operations beyond the control of other circuit elements or software, whether incorporated with the secure computing module 116 in a circuit or computing device, or a part of an extrinsic computing device. As a result, at least one secured operation performed by secure computing module 116 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 116 and/or a system or computing device incorporating secure computing module 116 based on the above-described set of assumptions. As a non-limiting, example, a secure computing module 116 designed to produce an expected result despite all software-only attacks may give rise to a first confidence level, whereas another secure computing module 116 designed to produce its expected result in the face of all software or hardware attacks may give rise to a second confidence level; the second confidence level may be higher, owing to the reduced probability that the second secure computing module 116 would be compromised.

Still viewing FIG. 1, secure computing module 116 may include a trusted platform module (TPM 120). In an embodiment, a TPM 120 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 120 may have any suitable elements of digital or analog circuitry usable to perform one or more processes as described herein, including without limitation processes used to determine confidence levels and/or authenticate digitally signed assertions as described below. TPM 120 may have memory and/or other logic and/or a processor in its own right which may be in a non-limiting example a crypto processor. TPM 120 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 116 may include at least PUF 124. PUF 124 may be implemented by various means. In an embodiment, PUF 124 includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100.

An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 124 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 124 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 124 in an embodiment include without limitation buskeeper PUFs, which may be similar to other PUFs based on bistable memory elements but leveraging buskeeper cells. PUF 124 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 124 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 124 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204*a*-*b*. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 124 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 124 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 124 that may be used may include, without limitation, nano electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchhoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 124 and/or TPM 120; such outputs may be used to generate symmetric or asymmetric keys, private keys, zero-knowledge proofs, or other proofs of authenticity, as described in further detail below.

Continuing to refer to FIG. 1, secure computing module 116 may implement one or more secure memory storage protocols. One or more secure memory storage protocols may be protocols designed to prevent unauthorized access to memory and/or to protect secure computing module 116 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 116. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 116 may incorporate a memory controller located within the trusted computing boundary to encrypt and authenticate by a secret key memory elements such as without limitation memory page tables and/or memory pages accessible by other software elements, such as an operating system. Various techniques, processes, means or elements may be used to implement the above-described secure memory protocols. For instance, secure computing module 116 may use hardware-enabled access control to protect memory access; hardware access control may, as a non-limiting example, be performed by tagging each memory entry with a "container identifier" corresponding to a page, file, or other grouping of memory, enabling secure computing module 116 to determine whether tampering has occurred.

Secure computing module 116 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 116 may operate using one or more dedicated memory objects, registers, or storage elements; as a non-limiting example, secure computing module 116 may operate with dedicated cache lines not available to other processes or circuits, preventing, e.g., stack or buffer overrun attacks to corrupt or steal data. Dedicated memory elements may be wired only to secure computing module 116; access to dedicated memory elements may be rendered impossible except by way of secure computing module 116. Secure computing module 116 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 116 may utilize oblivious random access memory (RAM) wherein memory access patterns are obfuscate to prevent detection of memory access patterns by outside observers attempting to deduce execution details regarding processes performed using secure computing module 116 Secure computing module 116 and/or device incorporating secure computing module 116 may incorporate a trusted non-volatile storage device that provides some means of verification of secure storage capability and other properties. Memory protocols as described above may be used to implement methods of attested storage and the chain of trust beginning at PUF 124 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 116.

Still referring to FIG. 1, secure computing module 116 may include a secure processor 126. Secure processor may be a processor as described below in reference to FIG. 5. Secure processor may operate autonomously from other processors and/or an operating system operating on at least a cryptographic evaluator; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 120, to frustrate alteration and/or probing to discover and/or alter private keys. Private keys may be demonstrable as uniquely associated with secure processor by use of PUF 124 as described above; secure processor may include, for instance, a TPM 120 as described above. Alternatively or additionally, a certificate authority as described above, which may be a manufacturer of secure processor, may verify that one or more public keys are associated uniquely with secure processor according to any protocol suitable for digital certificates.

With continued reference to FIG. 1, secure computing module 116 may implement one or more methods of attested computation. Attested computation may include or involve one or more methods to ensure that computation of a program, known as an attested program, is trusted and signed by secure computing module 116 and/or computing device incorporating secure computing module 116; this may be supported by means to assert the state of the system memory, code, and input data. In an embodiment, secure computing module 116 and/or a computing device incorporating secure computing module 116 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 116 and/or computing device incorporating secure computing module 116 may append a cryptographic signature based upon any private key that may be associated with secure computing module 116 as described herein. Secure computing module 116 and/or computing device incorporating secure computing module 116 may operate a security reset of working memory prior to load of data for trusted computation; for instance, the secure computing module 116 and/or computing device incorporating secure computing module 116 may append a hash of the memory to cryptographic hash of system state following reset and prior to loading data. Secure computing module 116 and/or computing device incorporating secure computing module 116 may append its authentication signature of memory page tables and/or memory tables. Upon completion of the trusted computation, which may include execution of program code of system state, secure computing module 116 and/or computing device incorporating secure computing module 116 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 116. Secure computing module 116 and/or computing device incorporating secure computing module 116 may include a system to compute one or more hash trees of cryptographic hash of the computation, system state, and/or outputs; secure computing module 116 and/or computing device incorporating secure computing module 116 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still viewing FIG. 1, in an embodiment, a non-secure processor and/or secure computing module 116 initiate a trusted protocol stack upon startup. For instance, and without limitation, evaluating device 104 and/or secure computing module 116 may implement a secure boot and/or attested boot protocol. In an embodiment, a basic input/output system (BIOS) that initiates upon startup of evaluating device 104 may compute a cryptographic hash of a boot loader of an operating system running on evaluating device 104; cryptographic hash may include boot drivers of one or more processes that initiate when evaluating device 104 starts up. Secure computing module 116 may then digitally sign cryptographic hash; cryptographic hash with or without digital signature, may be stored in memory. Evaluating device 104 may subsequently refuse to load any process that is not also signed with digital signature; this may in turn be used to perform attested computing procedures as described above.

Continuing to refer to FIG. 1, evaluating device 104 may implement at least a software monitor to enforce security invariants, and protected memory primitives, which may be referred to herein as enclaves. As used herein, a software monitor is a software component that operates in highest privilege mode of the processor, such as without limitation machine mode in the non-limiting example of the RISC-V processor ISA and may have exclusive access to a portion of memory, e.g. DRAM. The software monitor may check allocation decisions of software operating on evaluating device 104 and or a plurality of processors and/or computing devices making up a secure enclave for correctness and commit them into hardware configuration registers. Such software may include without limitation operating system, kernel, hypervisor, and/or guest OS. In this nomenclature, an operating system handles scheduling and demand paging, and a hypervisor may multiplex CPU cores of evaluating device 104 or devices. In a representative embodiment, software monitor may intermediate untrusted system software handling of isolated machine resources. Software monitor may verify decisions made by software operating on evaluating device 104 and/or devices for any events that may cause change in the protection domain/privilege mode of the evaluating device 104 and/or devices, including without limitation interrupts and fault handling, and may configure low level hardware resources when in at least a particular privilege mode. Hardware resources may include, without limitation, memory, such as physical memory pages, cache lines, processor cores that include all microarchitectural state, L1 cache and register files, and other resources. Software monitor may consider isolated protection domains including the monitor itself, enclaves, and untrusted software. Software monitor may ensure that resource allocation for one protection domain may not be modified by any other domain.

Still referring to FIG. 1, software monitor may be implemented in microcode, operate in the highest privilege level (e.g. machine mode in RISC-V processor), be implemented in hard coded logic, reconfigurable logic with protections on reconfiguration, or any combination of the foregoing. As a non-limiting example, software monitor may be invoked when software is executed in a secure enclave, and handle context switches between secure enclave mode, to and from less privileged mode(s). Software monitor may receive interrupt requests when operating a secure enclave operation, exit enclave operation including flushing of state and in example parking of enclave execution, and delegate the interrupt back to the operating system. Software monitor may intermediate handling of machine resources analogous to system calls in a typical OS. Software monitor may be conceived of as a state machine having states that may, as a non-limiting example, implement steps as follows: Software monitor may receive an event and authenticate a caller of the event; this may lead to three possibilities: (1) If caller is an OS interrupt and a secure enclave isn't operating, then the OS may receive the event; (2) If caller is an enclave interrupt, and the enclave has the handler, then the enclave may receive the event; otherwise, the enclave may asynchronously exit, meaning enclave cleans sensitive processor state, may park the enclave state in protected memory, and may delegate event to the OS—otherwise, the enclave may receive the event; (3) If event is a monitor call, and caller is authorized, then the request may be validated. If the request is concurrent, it may be handled, if it is invalid, it is thrown out and the caller may be flagged as potentially malicious; if it is valid, and no concurrent operations are happening, the monitor may proceed to change state cleanly (e.g., clean sensitive processor state and then switch privilege modes.

Continuing to refer to FIG. 1, to ensure protection domains are enforced, software monitor may enforce resource state transitions, which may occur in a non-limiting example as follows: if a resource requested is owned by owner (current user) or software monitor itself, the resource may be blocked. A requesting OS may demand the resource, in which case the sensitive processor state may be cleaned, and resource made available; finally the OS may grant the resource to a new owner. Software monitor may include a map of resource to owner, and lock on resource. These resource metadata may be pre-allocated to the monitor's binary image in case of statically partitioned resources such as cores and cache partitions. Software monitor may contain a cryptographic measurement (e.g. a hash) of certificates, keys, and of at least a first enclave. In an embodiment, software monitor may include an associated base address/address mask pair register in hardware that protects the location of the software monitor in memory space from corruption, bitmapped protected memory provisions, and the creation of page tables for each enclave within protected memory.

A secure boot and/or attested boot process may be used to achieve trustworthiness of software monitor and/or evaluating device 104 may execute a chain of attested boot upon reset to prove that the software monitor has not been tampered with and the at least a first enclave, referred to below as the signing enclave, is correctly constructed, such that core executed within the enclave may be considered trusted. Reset may occur on startup, restart, and/or upon a hard or soft reset of evaluating device 104.

Continuing to view FIG. 1, a non-limiting example illustrating, an attested boot sequence in a processor with at least one core is presented; this example is provided for expository purposes, and implementation of attested boot, related secure programming using evaluating device 104 and/or secure computing module 116 may be performed according to any processes and/or procedures that may occur to persons skilled in the art upon reviewing the entirety of this disclosure may operate according to an assumption that evaluating device 104 possesses a device specific secret, such as without limitation a cryptographic key pair, has been signed by a manufacturer of secure computing module 116, evaluating device 104 and/or other component or module described herein, such that one may evaluate the authenticity of the device by proof of possession of a valid signature; a device specific secret has been signed by a manufacturer, as used herein, where the manufacturer, or a device operated by the manufacturer, signs a verification datum, such as a public key, generated using the device-specific secret. Digital signature of manufacturer may be any digital signature as described above. As a result, a verification datum signed by manufacturer may be linked to secure proofs generated by device identifier using device-specific secret, such that manufacturer signature identifies secure computing module 116. In an embodiment, link of the manufacturer signature to device-specific secret may be used to verify authenticity of the software monitor by authentic signature of the device and cryptographic proof of construction of the software monitor Still viewing FIG. 1, in an embodiment a first core of a processor may be initialized; other cores may wait on interrupt from the first core. In an exemplary sequence, upon initialization of a first core, a cryptographic measurement root code may be booted from resistant hardware, such as, without limitation, on-chip read-only memory (ROM), and/or other hardcoded memory or circuitry. Software monitor may subsequently be loaded into memory from at least a non-volatile programmable memory. In an embodiment, all other memory address space may be cleared, zeroed, and/or set to a uniform value to achieve a known initial state. Continuing the illustrative example, at secure computing module 116 and/or a component thereof may generate device-specific secret; alternatively, a pre-shared secret may be loaded from protected memory, such as without limitation on-chip ROM, XOM, hardcoded circuitry, or the like. Further continuing the illustrative example, software monitor may be processed via a one-way cryptographic hash function as described above; an output of cryptographic hash function may be input to a key derivation function (KDF) along with device-specific secret, secure proof derived from device-specific secret, and/or verification datum derived from device-specific secret to generate software monitor public/private key pair. Cryptographic measurement root code may configure evaluating device 104 to sign software monitor public key and/or hash of the software monitor using device private key, and/or to cause device identifier to create a secure proof signing software monitor public key and/or hash of software monitor, establishing an attestation certificate of the software monitor. As noted above, measurement root may include dedicated circuitry that configures a computing device and/or secure computing module 116 to check the authenticity of the software monitor; for instance, the measurement root may generate an at least a first attestation key pair and sign the software monitor's public key with the processor's key system as described above.

Still referring to FIG. 1, examples of secure computing module 116s may include, without limitation, a TPM 120 as described above. Secure computing module 116 may include a TPM 120 combined with a boot-measuring protocol using hash trees, Merkle trees, or the like to measure boot entries to create an "attested boot." Secure computing module 116 may include a trusted execution technology (TXT) module combining TPM 120 with establishment of a secure container at run-time; secure container may be isolated from a software stack and OS of at least a temporal attester 104 and/or use TPM 120 to measure and attest to secure container prior to launch. Secure computing module 116 may include execute-only memory (XOM). Secure computing module 116 may include an Aegis processor. Secure computing module 116 may include a Bastion processor.

Secure computing module 116 may implement a trusted enclave, also known as a trusted execution environment (TEE). In an embodiment, a trusted enclave may be a portion of a computing device that is isolated from the main processor of the computing device. Isolation may be achieved using elements of secure computing module 116 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 108 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. RISC V architecture, including without limitation sanctum processors, Ascend secure infrastructure, Ghostrider secure infrastructure, ARM TrustZone, Trusted Little Kernel (TLK)

as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 116, TEE, or trusted enclaves as disclosed herein. System 100 may incorporate or communicate with a certificate authority, which may include any certificate authority and/or version thereof as described in this disclosure.

In an embodiment, and still referring to FIG. 1, one or more remote devices may include at least a device that does not have trusted hardware. In this case the authenticity of the information used to establish heuristics of trust may itself be authenticated using threshold cryptography, consensus, proof of authority, proof of stake, proof of elapsed time, and the like, according to methods including without limitation methods disclosed below.

In an embodiment, and continuing to refer to FIG. 1, one or more remote devices 108 may include at least a verified device 128. At least a verified device 128 may be a device having an associated confidence level above a given threshold; threshold may be extremely high, placing at least a verified device 128 in a "highly trusted" category within system 100. At least a verified device 128 may be associated with an entity having special status with regard to system 100, such as without limitation an entity possessing or offering a platform with regard to which confidence levels, heuristics, and/or access levels are being used as described herein. For instance, at least a verified device 128 may be a device operated by a company or the like having an institutional identifier in the system. At least a verified device 128 may be identified using a secure computing module 116 incorporated in at least a verified device 128. An identifier of at least a verified device 128 may be recorded in a verified device register 132; processes to determine whether a device of one or more remote devices 108 is a verified device are described in further detail below. Verified device register 132 may include any data structure listing verified devices, including a temporally sequential listing as described in further detail below.

Referring now to FIG. 2, system 100 may be used to perform one or more processing steps necessary to create, maintain, and/or authenticate a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a cryptographic evaluator as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order, and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP_RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a cryptographic evaluator, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a direct anonymous authentication procedure, and other information quantifying the trusted status of the cryptographic evaluator) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 5. For example, and without limitation, at least a digitally signed assertion 200 may include one or more encrypted or otherwise secured or partitioned memory entries as entered for instance using a secure computing module 116 or according to a secure computing protocol as described in further detail below.

Referring again to FIG. 1, in some embodiments, secure computing module 116 and/or cryptographic evaluator may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing module 116*s*, man in the middle or other attacks.

Figure 3:
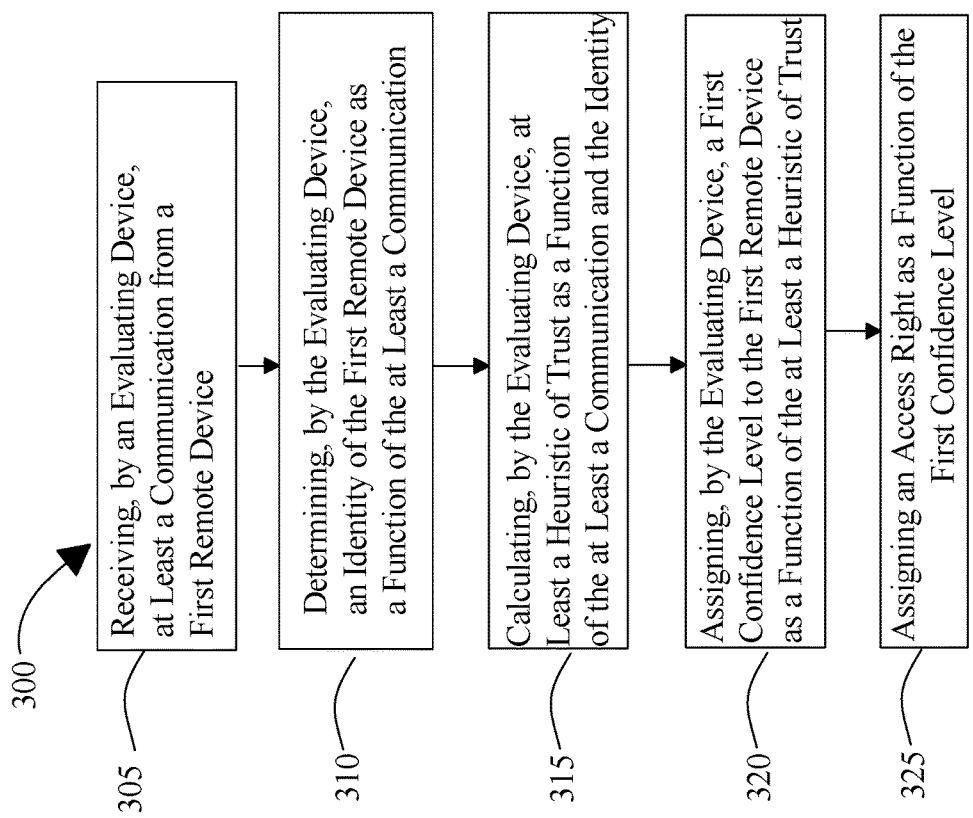
FIG. 3 illustrates particular implementations of various steps of a method of determining a confidence level associated with a device using heuristics of trust.

Referring now to FIG. 3, an exemplary embodiment of a method 300 of determining a confidence level associated with a device using heuristics of trust is illustrated. At step 305, evaluating device 104 receives at least a communication from first remote device 112. Evaluating device 104 may receive at least a communication in any suitable form, including without limitation as textual data conveyed via electronic communication. At least a communication may include at least a packet set transmitted over a network; at least a packet set may be transferred over the network according to transfer control protocol/internet protocol (TCP/IP), hyper-text transfer protocol (HTTP), file transfer protocol (FTP), HTTP secure (HTTPS) or the like. At least a packet set may have data organized in one or more fields as described in further detail below; such data may be used for device fingerprinting or other device identification procedures as described in further detail below. Evaluating device 104 may alternatively or additionally receive at least a communication by retrieving it from memory where it has been stored either entirely or in a representation such as a cryptographic hash as described above. Retrieval may include retrieval from any suitable data structure; for instance, and without limitation, retrieval may include receiving a transaction recorded in a temporally sequential listing.

At step 310, and still viewing FIG. 3, evaluating device 104 determines an identity of first remote device 112 as a function of at least a communication. Identifying may include, as a non-limiting example, comparing at least a datum received as an identifier from first remote device 112 to one or more stored values; one or more stored values may be stored in a temporally sequential listing as described above. One or more stored values may be stored in a database or other data structure. Identifying may include comparison of a digitally signed assertion and/or secure proof, as described in further detail below, in a temporally sequential listing or other data structure to a digitally signed assertion and/or secure proof received from first remote device 112.

Still viewing FIG. 3, determining identity of first remote device 112 may include fingerprinting the first remote device; this may be performed as a function of at least a field parameter of the at least a communication. At least a field parameter may be any specific value set by first remote device 112 and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of the first remote device 112 may include fingerprinting the first remote device 112 as a function of at least a machine operation parameter described in the at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of first remote device 112, a browser running on first remote device 112, or the like, or any other parameters of machine control or action available in at least a communication. In an embodiment, a plurality of such values may be assembled to identify first remote device 112 and distinguish it from other devices of one or more remote devices 108.

With continued reference to FIG. 3, identifying first remote device 112 may include evaluating a secure proof generated by the first remote device 112 and identifying the first remote device 112 as a function of the secure proof. Secure proof may include any secure proof as described above including without limitation a secure proof demonstrating possession of a secret stored in or produced by secure computing module 116 and/or PUF 124. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

With continued reference to FIG. 3, secure proof may include a digital signature. In an embodiment, digital signature may be any digital signature as described above; digital signature may be created by signing a mathematical representation of first dataset. In an embodiment, first remote device 112 may generate a key to be used in producing digital signature using secure computing module 116. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, first remote device 112 and/or secure computing module 116 may convert immediate output from PUF 124 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, first remote device 112 and/or secure computing module 116 may extract one or more random numbers based on a PUF 124 output to create a symmetric key as described above. Alternatively or additionally, extraction may include extraction of a private key of a public key cryptographic system.

Still referring to FIG. 3, key extraction may include use of a number output by a PUF 124 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 124; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to first remote device 112 and/or secure computing module 116. Persons skilled in the art, upon reading the entirety of this disclosure, will be aware of various ways in which a random number may be used to generate a private and public key pair consistently with this disclosure.

Still viewing FIG. 3, key extraction may utilize a numerical output from a PUF 124 or other element of secure computing module 116 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 124 and/or elements of secure computing module 116 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 116 may act as a "first signer" of a digital signature, signing with a private key produced from a secret generator module as described above, which may be a group key. In an embodiment Secure computing module 116 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by Secure computing module 116 to perform a digital signature. This process may, for instance, enable generation of novel secret keys using additional circuitry, to demonstrate, for instance, timeliness of execution and frustrate delay-based attacks. DAA may perform digital signature using a zero-knowledge proof, for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

Still referring to FIG. 3, secure proof may include be generated using a physically unclonable function. For instance, and without limitation, an output of a PUF 124 may be used to generate a private key for a digital signature as described above. Alternatively or additionally, a PUF 124 output may constitute a secret to be used as a basis for a zero-knowledge proof, which may be any zero-knowledge proof as described herein.

Still referring to FIG. 3, secure computing module 116 and/or first remote device 112 may generate one or more elements of additional information that user or device may use to evaluate secure proof. For instance, secure computing module 116 and/or first remote device 112 may generate a public key; public key may be provided automatically to any querying device. Alternatively or additionally, public key may be provided to a manufacturer of secure computing module 116, permitting manufacturer to act as a certificate authority for secure computing module 116. Similarly, secure computing module 116 and/or first remote device 112 may generate data necessary to perform verification of a zero-knowledge proof by any verifier as described above.

With continued reference to FIG. 3, evaluating the secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

Still referring to FIG. 3, secure proof and/or verification data may be included in at least a communication; for instance, and without limitation, first remote device 112 may transmit a communication including secure proof as part of a secure sockets layer communication or the like, with or without a digital certificate issued by a certificate authority. Alternatively or additionally secure proof may function as or be a portion of a digital signature for a digitally signed assertion as described in further detail above.

With continued reference to FIG. 3, in an embodiment, determining identity of first remote device 112 may include determining a geographic location of first remote device 112. This may be accomplished in various ways. For instance, and without limitation, determining the geographic location of first remote device 112 may include identifying an internet protocol address of first remote device 112 and determining the geographic location as a function of internet protocol address; this may be accomplished according to IP address geolocation. Alternatively or additionally, determination of geographic location may include determination of proximity to a verified device 128, where verified device 128 may have a known, recorded, or verified geographic location, and/or of proximity to evaluating device 104.

Still referring to FIG. 3, proximity may be determined according one or more measures of distance or time verified device 128 and first remote device 112, and/or first remote device 112 and evaluating device 104. For instance, and without limitation, where one device is connected to another via a network, proximity may be evaluated by measuring distances between the two devices in a graph representing the network; proximity may include, for instance a number of steps through the graph from the once device to another. Steps may also be weighted according to, e.g., estimates of physical distance or length of wire between devices connected by steps, as measured using network latency analysis and/or other processes for instance as described below. Proximity may include geographical location of any devices as described above may alternatively or additionally be determined using navigational facilities, such as the global positioning system (GPS) or other protocols used to determine the location of a device. Distance between devices may be computed using this information. Proximity may include temporal proximity; this may be computed using network latency analysis, time for response to a "ping" signal, or the like. Alternatively or additionally, past response times and/or past times involving communications in the past may be recorded in memory and/or in a temporally sequential listing. In an embodiment, geographic location of first remote device 112 may be determined as near to or within a certain radius of a device having a known geographic location.

Continuing to refer to FIG. 3, determining identity of first remote device 112 may include identifying the first remote device 112 as a function of user profile information belonging to a user operating the first remote device 112. User profile information may include any information user provides about him or herself explicitly, as well as information recorded in past sessions, including without limitation transaction histories, search history, history of information sent or received by user, and the like. User profile information may identify user according personal identification information such as name or date of birth; alternatively one or more data of such personally identifying data may be omitted or stripped from user profile information to protect user privacy or anonymity.

At step 315, and still referring to FIG. 3, evaluating device calculates at least a heuristic of trust as a function of the at least a communication and the identity. At least a heuristic of trust may include one or more processes for determining a degree to which first remote device may be treated as trustworthy, based on partial or limited information; for instance, at least a heuristic of trust may be calculated or computed with regard to a first remote device 112 not identifiable using a secure computing module 116, by using geographic location, device fingerprint information, and/or other data as described in further detail herein, to identify determine trust in a device that is not as definitely identifiable as it would be using a secure computing module 116. At least heuristic of trust may output a confidence level as defined above as its output, and/or take at a confidence level as an input. Heuristics to infer trustworthiness of nodes and/or remote devices 108 may be used in a positive or negative sense—that is, a positive heuristic connotes more trustworthiness, while a negative heuristic can be used to flag outliers that may be considered more likely to behave dishonestly.

With continued reference to FIG. 3, calculating the at least a heuristic of trust may include reconciling a first datum of at least a communication to at least a second datum of the at least a communication. For instance, user profile may contain information that may be compared to transaction history and/or device fingerprint; where such information is inconsistent in a manner suggesting some prevarication or degree of obfuscation, this may result in a lower confidence level than if such data is consistent. As a non-limiting example, calculating the at least a heuristic of trust further comprises reconciling a first geographic location determination with at least a second geographic determination; for instance, an IP address of first remote device 112 may be linked to a first geographic location according to IP geolocation, but proximity to a known device, such as evaluation device and/or verified device 128, timing of transaction, user profile, or other information may suggest a different geographic location. In an embodiment, such a location-based inconsistency may be used to assign a lower confidence level as described below; alternatively, where connection via a TOR or proxy connection, for instance, is not necessarily treated as indicative of untrustworthiness, this may lead to exclusion of location-based identification and/or confidence-level determination for first remote device 112. In an embodiment, a heuristic to infer trustworthiness of a node is established as a function of the position of a node within a network graph over time and properties related to location and network latency. In example, a node whose position suddenly changes may incur a reduction in trust level, if its location or timing latency changes in a manner inconsistent with historic trends, indicating e.g. potential compromise, man in the attack or other. Node location within the network graph in this context may be established by one or more means, including without limitation means for locating within a network or assessing proximity to one or more other devices, as measured via communication latency or timing analysis relative to other nodes in the network ("triangulation"), by geospatial information provided via e.g. GPS or other beacon based location services, and the like.

Still referring to FIG. 3, calculation of at least a heuristic of trust may include determining a duration of past interaction and calculating the at least a heuristic as a function of the duration of past interaction; for instance, if first remote device 112 has a longer history of interactions with evaluation device 104 and/or a network or platform at issue, evaluation device 104 may assign a higher confidence level to first remote device 112. Calculating the at least a heuristic of trust may include determining a most recent time of past interaction and calculating the at least a heuristic of trust as a function of the most recent time of past interaction; for instance, where first remote device 112 has interacted with evaluation device 104 and/or a network or platform in question more recently a higher confidence level may be associated with first remote device 112. Calculating at least a heuristic of trust may include determining a degree of obscurity of the first remote device 112; for instance, where first remote device 112 is sandboxed (preventing evaluation of machine-control parameters), or connecting through a proxy, TOR or other location/IP address-obscuring protocol or facility, the resulting inability to discover information concerning first remote device 112 may itself be used to assign a lower confidence level to at least a first remote device 112.

Continuing to refer to FIG. 3, calculating at least a heuristic of trust may be performed by analysis of past interactions of first remote device 112 with system 100. For instance, and without limitation, calculating at least a heuristic of trust may include evaluating a degree of stake in at least a transaction to which the first remote device 112 is a party. For instance, and without limitation, where first remote device 112 is performing an exchange of value or financial transaction, where a current financial transaction involves a large amount of money, confidence level may be lowered. Calculation of at least a heuristic of trust may include identifying a plurality of transactions performed by first remote device and deriving an average transaction amount of the plurality of transactions; thus, for instance, where first remote device 112 has performed several transactions having a first average amount, and a current transaction involves a second amount less than or equal to first average amount, this may result in a higher confidence level being assigned to first remote device 112 than if second amount is much larger than first average amount. Calculating the at least a heuristic of trust may include determining a second confidence level in the identity of the first remote device, calculating the at least a heuristic as a function of the second confidence level; for instance, and without limitation, second confidence level may be a percentage of certainty concerning the determined identity, which may be used to weight first confidence level. In a further embodiment, a heuristic to infer trustworthiness of a node is established as a function of the regularity of transactional behavior; for instance, and without limitation, a heuristic of trust may assign a higher confidence level to first remote device 112 if first remote device 112 frequently interacts with system 100 and/or performs transactions or other interactions within system than if first remote device 112 interacts with system 100 infrequently. In an embodiment, a heuristic to infer trustworthiness of a node may be established by the total time the node has behaved honestly, the product of time and transaction value, any other similar combination of parameters of transaction history. Alternatively or additionally, heuristic of trust may be determined at least in part using an algorithm assessing a number of connections from one device to another, such as without limitation a number of references to first remote device 112 in hypertext markup language (HTML) files or the like; this may be implemented, without limitation, similarly to a PageRank algorithm as promulgated by Google, Inc. of Mountain View, Calif.

In an embodiment, and still referring to FIG. 3, system 100, evaluating device 104 and/or other elements of network may mandate that trust levels used in smart contracts or other interactions be adequately up to date; for instance, nodes operating smart contracts may be required maintain a threshold of freshness, as measured by recency of interaction with system 100 or elements thereof. The network may incentivize this freshness by penalizing transactions that are not up to date, for instance by requiring additional verifications of such a transaction or computation. This liveness parameter may incorporate a timeout or other means such that the contract itself is invalidated if the timeout expires before the completion of the smart contract.

Still viewing FIG. 3, calculation of heuristic may involve aggregation of heuristic outputs produced by evaluation of a plurality of heuristics. For instance, where output of each heuristic is a confidence level, evaluation device may calculate an aggregate confidence level. Establishment of an aggregate confidence level in first remote device 112 may involve, e.g., adding together confidence levels; alternatively, aggregate confidence level may be computed by viewing each confidence level as a probability and calculating an aggregate probability by averaging or other statistical combination processes. Alternatively or additionally, a machine-learning algorithm may analyze past transactions or interactions to determine an optimal mathematical operation for calculating an aggregate confidence level.

Continuing to refer to FIG. 3, in an embodiment, evaluator device 104 may delegate calculation of one or more heuristics of trust of at least a heuristic of trust to at least an additional device of one or more remote devices 108. Evaluator device 104 may elect one or more devices to calculate the one or more heuristics of trust. Election process may make use any of proof by threshold of consensus, proof of authority, proof of stake, proof of elapsed time, or any other distributed validation method apparent to those skilled in the art. In an embodiment, information used to establish heuristics of trust may be obtained by incentivizing collection or aggregation of data by one or more remote devices 108 and/or evaluating device using one or more economic schemes. In a nonlimiting example, evaluating device 104 and/or remote device of the one or more remote devices 108 in the network collects information that is considered "fresh", e.g., has an authenticated time stamp that reflects it has been obtained within a period of time defined by the network protocol, and considered authentic. In the case of collection by a trusted hardware node, such as a verified device as described elsewhere in this disclosure, authenticity may be defined as having incorporated a valid signature of authenticity. In the case of untrusted hardware, such as a remote device of one or more remote devices 108 that does not include a secure computing module 116, or that possesses a secure computing module 116 associated with a confidence level and/or confidence level in identity falling below a threshold required for treatment as a verified device, authenticity may be defined as having been validated using any heuristic of trust, including without limitation some proof by threshold of consensus, by proof of authority, by proof of stake, by proof of elapsed time, or any other distributed validation method that may be apparent to those skilled in the art, upon reviewing the entirety of this disclosure.

In the case of a permissioned or private network, in a representative embodiment, information used to establish heuristics of trust may be obtained by one or more remote devices 108 dedicated to performing such a task, including without limitation one or more verified devices. This selection of dedicated devices may be performed to safeguard privacy or data integrity, or to reserve computationally expensive calculation of heuristics of trust to devices having security and/or computational abilities to achieve such goals. For instance, in an embodiment, in order to preserve privacy and confidentiality of behavior of nodes that may otherwise be obtained via mining of metadata, computing heuristics to infer trust may be restricted to only occur within specialized nodes in the network for instance, local heuristic data may be encrypted by miner nodes or others, with only a subset of trusted nodes having the decryption key. Data for heuristic calculation may be broadcast with prioritized routing, header flags or the like to minimize network congestion.

Still viewing FIG. 3, one or more machine learning algorithms may be performed by remote devices 108 calculating heuristics of trust. In a representative embodiment, system 100 incorporates heuristic engines, or trust heuristics that are operated by machine learning algorithms, deep learning algorithms, convolutional neural networks, feed forward neural networks and the like maintained as smart contracts. In an embodiment, a heuristic engine is a machine learning algorithm operated as a smart contract within a trusted computing boundary. Devices performing such machine learning and/or artificial intelligence algorithms may be selected as dedicated devices and/or verified devices as described above. Alternatively or additionally, such devices may include devices that perform heuristic calculations according to one or more incentive schemes. For instance, the computationally intensive training of these algorithms may be incentivized via economic schemes, e.g. economic remuneration in exchange for operating correct training computations. Representative examples may utilize one or more nodes with a trusted execution enclave, inherently secure processor or other attestable computing architecture, or utilize zero knowledge proofs (e.g. ZK-STARKs, ZK-SNARKs) to provably perform training computations. In a representative embodiment, the parameters resulting from optimization of the heuristic engine via training computations may be propagated to other nodes within the network in order to iteratively improve both the accuracy and efficiency of the heuristics utilized. In a non-limiting example, a trained model may suggest that trust heuristics are most accurate utilizing a given parameter sampled at a particular temporal resolution, e.g. once every N transactions or every M units of time. The network may then incentivize collection of such parameters directly from the nodes on the network by penalizing those that do not provide such parameters. Parameters may be shared as a selective broadcast with time stamp to prove liveness (e.g. an incremented counter, attested time, etc.). This broadcast may be encrypted by any number of means such that only a subset of nodes in the network can decrypt the broadcast, e.g. in order to preserve privacy and confidentiality of behavior of nodes that may otherwise be obtained via mining of metadata. In such a scenario, the subset of nodes performing decryption may be elected as described above, may have requirements of minimum hardware security, and may utilize threshold cryptography. To maximize efficiency, this decryption of heuristic information may be performed in federated, sharded or otherwise subdivided networks. Alternatively or additionally, heuristics of trust are sampled probabilistically, e.g. via random beacons as described in the Ethereum protocol, via randomization via proof of elapsed time, or any other means to establish random election or sampling.

In an embodiment, and with continued reference to FIG. 3, calculating at least a heuristic of trust may include receiving, from a verified device, a datum identifying the first device, and calculating the at least a heuristic of trust as a function of the datum identifying the first device. Datum identifying first remote device 112 may include a digitally signed assertion generated by the verified remote device 128; digitally signed assertion may be created using any protocol for creation of a digitally signed assertion, including a digital signature signed with a private key possessed and/or generated by verified remote device 128, a secure proof, as defined above, generated according to any protocol or combination of protocols as described above by verified remote device 128, or the like. Identification of at least a second cryptographic evaluator and/or other device may include verification information that may be combined with a secure proof issued by second cryptographic evaluator to verify or authenticate second cryptographic evaluator, including without limitation an address as described above, a public key as described above, a verification associated with a zero-knowledge proof, or the like. This may be combined with other metrics or evaluation of other information regarding interactions between first remote device 112 and verified remote device 128, including trusted time evaluation to assess communication time between verified remote device 128 and first remote device 112, according to trusted time procedures as described in further detail below.

In an embodiment, a heuristic to infer trustworthiness of a node may be established as a function of a given node's association with other nodes considered highly trusted by either intrinsic properties (e.g., trust established by inherently secure processor architecture, attested chain of trust, trusted enclave, or similar), or by inferred properties (e.g., iterative heuristics). In an example, a node with little history on a network participates in transactions with one or more other nodes that have established trust levels by construction (intrinsic trust properties), and/or with a longer history of honest execution (inferred trust properties). In this case, some beneficial weight is assigned to the new, relatively unknown node by way of the association with the node(s) with a longer history of honest execution. Thus, as a non-limiting example, calculation of at least a heuristic of trust may include determining a confidence level of at least a second device, for instance of one or more remote devices 108, associated with first remote device 112 through transactions and calculating the at least a heuristic of trust as a function of the confidence level of the at least a second device. Such association may be evaluated or weighted according to number or duration of transactions in which first remote device 112 and second device were involved, transaction amounts of such transactions, a number of verifications performed between first remote device and second device, or any combination of the above.

At step 320, and still referring to FIG. 3, evaluating device 104 assigns a first confidence level to the first remote device as a function of the at least a heuristic of trust. This may include, without limitation, aggregating a plurality of heuristics of trust and/or outputs thereof and assigning the at least a first confidence level as a function of the aggregated plurality of heuristics, as described above. Alternatively or additionally, assigning the first confidence level may include retrieving a second confidence level associated with the first remote device, and assigning the first confidence level as a function of the second confidence level. Second confidence level may be any previously determined confidence level, which may be stored in any suitable data structure or memory. For instance, and without limitation, retrieving the second confidence level may include evaluating an assertion, in a temporally sequential listing of assertions, assigning the second confidence level to the first remote device; assertion may have been recorded in temporally sequential listing by evaluating device 104, one or more verified remote devices 128, and/or a consensus determination involving one or more remote devices 108.

Still viewing FIG. 3, determining a confidence level may include evaluating at least a digitally signed assertion signed by first remote device 112, and determining a confidence level to the first remote device 112 as a function of the evaluation of the at least a digitally signed assertion. At least a digitally signed assertion may be identified as signed by first remote device 112 using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in the blockchain. At least a digitally signed assertion may include a plurality of digitally signed assertions. For instance, first remote device 112 may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, first remote device 112 may enter an initial digitally signed assertion attesting to one or more elements of identification and/or authentication, including without limitation attestation of manufacturing date of first remote device 112 and/or secure computing module 116, identities, serial numbers, versions, or make of hardware components of first remote device 112 and/or secure computing module 116, or the like. Transactions performed by first remote device 112 may be scored according to authenticity; for instance, trusted status may be conferred on at least a cryptographic evaluator only if a certain number of authenticated transactions have been performed by first remote device 112, a certain amount of value has been conveyed in authenticated transactions by at least a node, a certain proportion (which may be 100%) of transactions performed by first remote device 112 have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by first remote device 112, for instance.

Still referring to FIG. 3, determining the at least a confidence level may include receiving a consensus evaluation of the at least a confidence level from a network of remote devices 108. for instance, all remote devices 108 currently connected to network may determine a confidence level concerning first remote device 112. This determination may be performed, for instance, by authenticating one or more current or past instances of a temporally sequential listing 204 and/or one or more sub-listings 208 thereof. Determination may include identification of one or more rejected instances of temporally sequential listing 204. Each device of one or more remote devices 108 may provide a confidence level for the cryptographic evaluator to be evaluated. Evaluating device 104 and/or another processor communicatively coupled to network may calculate an aggregate confidence level based on confidence levels submitted by one or more remote devices 108; aggregation may be performed according to any method for aggregation of confidence levels described above. In an embodiment, aggregation may be weighted according to a previously determined confidence level of first remote device 112 by one or more remote devices 108 performing consensus determination of confidence level of first remote device 112. This may include, e.g., ignoring confidence level submissions from remote devices 108 having confidence levels below a certain threshold; alternatively or additionally, evaluating device 104 may request confidence level determinations by a plurality of evaluators previously determined to have a confidence level above a certain threshold level. Each remote device 108 and/or other processor participating in consensus determination of confidence level may perform any action described herein for determining a confidence level, or any combination of such actions.

With continued reference to FIG. 3, determining the at least a confidence level may include evaluating a digitally signed assertion assigning a recorded confidence level to first remote device 112, and determining the confidence level as a function of the recorded confidence level. Digitally signed assertion may be any digitally signed assertion as described herein. Digitally signed assertion may be included in any temporally sequential listing as described herein; temporally sequential listing may include a temporally sequential listing relating at least an identifier of first remote device 112 to confidence levels, where identifiers may be any data usable as identifiers as described herein. Assignment of confidence level may be performed as a function of identifier; that is, identifier may be linked to an identity of a first remote device 112, which may be used for assignment of confidence level as described in this disclosure. Evaluating device 104 may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, evaluating device 104, and/or a network of remote devices 108 having a confidence level in excess of a threshold, may have previously evaluated a confidence level in a certain first remote device 112; in an embodiment, such a confidence level may itself be recorded in an assertion listed in temporally sequential listing 204. A plurality of such assertions, corresponding to one or more remote devices 108, may be listed; as such, evaluating device 104 may determine confidence level in first remote device 112 solely by retrieving a confidence level so recorded. Alternatively or additionally, evaluating device 104 may combine such confidence levels with confidence level determinations made by other means. Combination may be performed, e.g., by retrieving such confidence levels from temporally sequential listing 204 for first remote device 112 and calculating a confidence level for first remote device 112 by any other process described above. As a further example, evaluating device 104 may retrieve a confidence level recorded in temporally sequential listing 204 for first remote device 112, determine a confidence level for the same first remote device 112, and then aggregate the two confidence levels according to any process as described above for aggregation of confidence levels.

Still referring to FIG. 3, evaluating device 104 may further weight or modify confidence level according to one or more additional factors, including one or more heuristics of trust as described herein. For instance, confidence level may be weighted according to how recently first remote device 112 signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example a first remote device 112 that has recently "sold off" a large amount of value and/or has an assertion in a sub-listing 208 currently awaiting authentication may have its confidence level decreased. As a further example, a first remote device 112 with little or no history, or a more obscure first remote device 112, may be assigned some minimal or "neutral" confidence level. Where first remote device 112 is associated with a previous fraudulent transaction it may be assigned a confidence level of zero or may be excluded from interactions with other devices according to access levels as described below.

With continued reference to FIG. 3, determining the at least a confidence level may include performing a trusted time evaluation of at least an action performed by the first remote device 112. As a non-limiting example, secure proof may be generated using a secure timestamp. Generating the secure timestamp may include digitally signing the secure timestamp using any digital signature protocol as described above. Secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted time-stamped data back to the listener device. Alternatively or additionally, one or more additional participants, such as other remote devices 108 and/or verified remote devices 128 may evaluate confidence levels in first remote device 112 or other party generating secure timestamp and/or perform threshold cryptography with a plurality of such parties, each of which may have performed an embodiment of method to produce a secure timestamp. In an embodiment, remote devices 108 and/or verified remote devices 128 may perform authentication at least in part by evaluating timeliness of entry and/or generation of first digitally signed assertion 200 as assessed against secure timestamp. In an embodiment, secure proof is generated using an attested computing protocol; this may be performed, as a non-limiting example, using any protocol for attested computing as described above. Attested time may be implemented, without limitation, as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

Still referring to FIG. 3, evaluating device 104 may determine a confidence level in an identity of the first remote device 112; determining the at least a confidence level may include determining the at least a confidence level as a function of the at least a confidence level in the identity. Confidence level in identity may be computed, for instance, using one or more statistical measures of reliability of the identification method used; for instance, a user may enter an instruction on evaluating device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise determining a confidence level as a function of the confidence level in the identity. Evaluating device 104 may also determine confidence level in identity as a function of, for instance, one or more algorithms collecting statistics concerning degree of accuracy in past iterations of method of a particular process for identifying at least a first remote device 112.

With continued reference to FIG. 3, at step 325, method 300 includes assigning an access right as a function of the first confidence level. An access right may be a right to use a computer resource; access right may include access to data; access to data may include ability to access a data store in memory and/or ability to decrypt an encrypted datum. Access right may include ability to enter one or more commands on a computing device, where command may be a command to modify data stored on the computing device, to configure computing device, or to activate one or more controls. For instance, a user of a social networking website may have extensive access rights to the user's own profile, including the ability to modify data shown on the profile, may have lesser access rights to persons with whom the user has established a relationship, permitting the user to view and/or comment on data but not to modify it, and may have no or virtually no ability to access other profiles. Similarly, a user may have access rights to a platform enabling financial or similar transactions commensurate with a confidence level assigned to first remote device 112; access rights might enable a user of first remote device 112 to perform financial transactions less than or equal to a certain amount, for instance, as a result of a confidence level associated with first remote device 112 according to this method.

Figure 4:
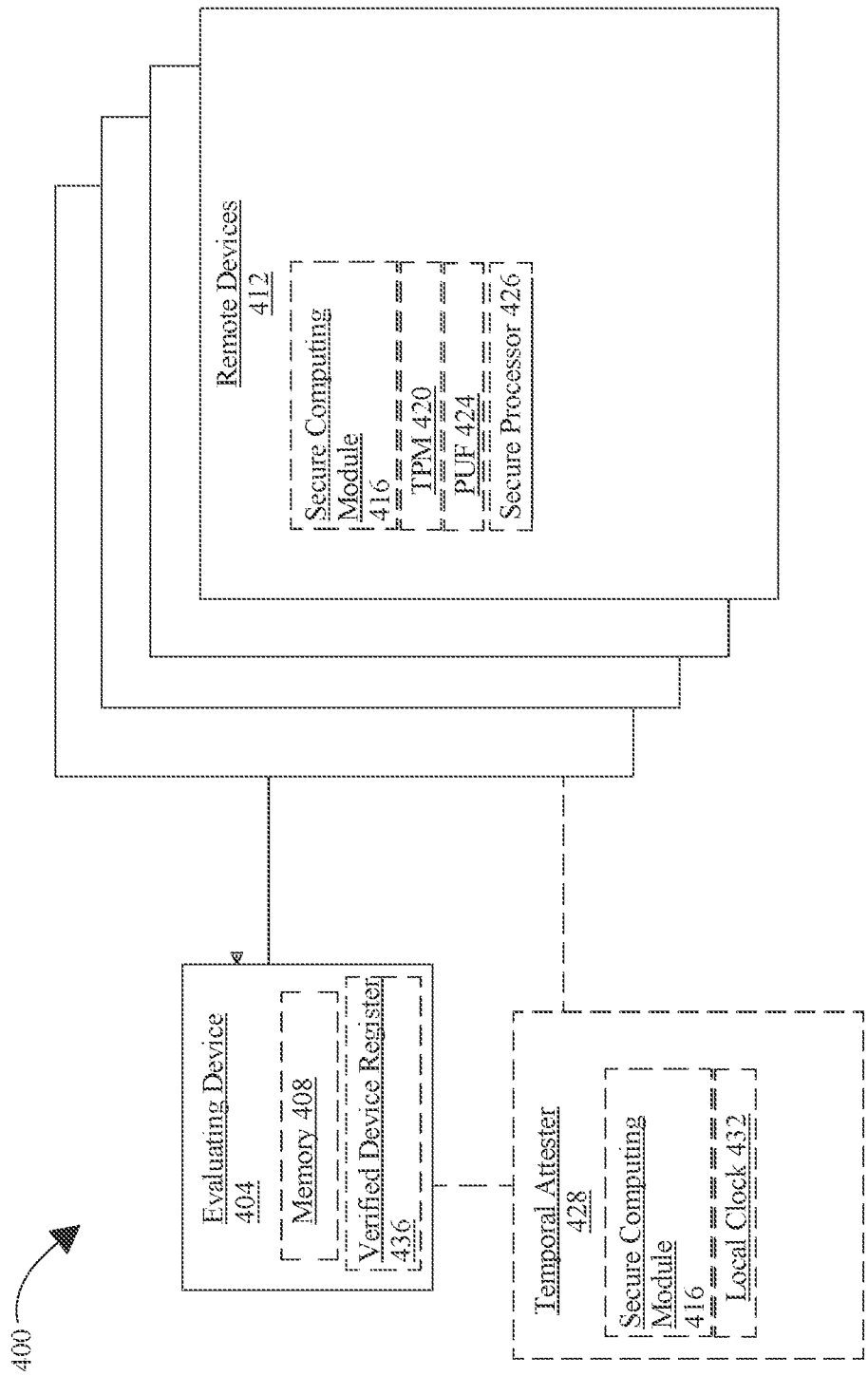
FIG. 4 is a block diagram illustrating an exemplary embodiment of a system for assigning a confidence level to a remote device as a function of temporal attributes.

Referring now to FIG. 4, an exemplary embodiment of a system 400 for distributed key storage is illustrated. System 400 includes an evaluating device 404. Evaluating device 404 may be any processor as described in this disclosure. Evaluating device 404 may be included in any computing device as described in this disclosure. Evaluating device 404 may include a single processor and/or device operating independently, or may include two or more processors and/or devices operating in concert, in parallel, sequentially or the like; two or more processors and/or devices may be included together in a single computing device or in two or more computing devices. Evaluating device 404 may be an element of, include, be in communication with, or otherwise utilize a secure computing module as described below in further detail. Evaluating device 404 may be or include a remote device as described below in further detail.

Still referring to FIG. 4, evaluating device 404 includes and/or is in communication with a memory 408. Memory 408 may include any form of memory described in this disclosure. Memory 408 may be incorporated in a device containing evaluating device 404, distributed through several devices, which may contain evaluating device 404, or a component thereof, or in another device accessible to evaluating device 404 via electronic communication. Evaluating device 404 may be communicatively connected a plurality of remote devices 412; each remote device may include any device suitable for use as evaluator 404. Evaluating device 404 may be designed and configured to perform any method step or steps as disclosed herein; as a non-limiting example, evaluating device 404 may be designed and configured to receive at least a communication identifying a remote device, determine at least a temporal attribute of the at least a communication, and assign a first confidence level to the remote device as a function of the at least a temporal attribute and the at least a communication. Remote device 412 may include a secure computing module 416, TPM 420, secure processor 426, and/or PUF 424, each of which may be implemented as described above in reference to FIGS. 1-3.

Still referring to FIG. 4, system 400 may include at least a temporal attester 428. At least a temporal attester 428, as used herein, is a device that can generate and provide secure timestamps. A secure timestamp, as used herein, is a cryptographically secure timestamp representing a current moment in time as determined by at least a temporal attester 428, which may be generated as set forth in further detail below. At least a temporal attester 428 may include a local clock 432. Local clock 432 may be any device used for measurement of time; local clock 432 may include without limitation an oscillator, such as a crystal oscillator, a mechanical oscillator or escape mechanism, an atomic oscillator such as a Cesium-based clock. Local clock 432 may be a precision clock as described above. Local clock 432 may include a memory; for instance, local clock 432 may include a memory containing a current time at some point in time, which local clock 432 may increment according to measurements of oscillator. Current time may include a date as recorded using any calendar system, a time of day, a number of seconds that have elapsed since some accepted or recorded benchmark time, a Julian date, or the like. Local clock 432 and/or at least a temporal attester 428 may compare time generated by local clock 432 to a reference time received from another device; reference time may, for instance be received from a reference clock, or a network in communication with a reference clock. In an embodiment, reference clock may be a precision reference clock, in nonlimiting example an atomic reference clock e.g. a Cesium-based clock. Local clock 432 and/or at least a temporal attester 428 may modify or correct current time as calculated using local clock 432, as a function of reference local clock 432; for instance, where current time according to local clock 432 differs from current time according to reference clock, local clock 432 and/or at least a temporal attester 428 may modify current time of local clock 432 to match current time according to reference clock. Local clock 432 and/or at least a temporal attester 428 may perform additional functions to maintain an accurate current time, such as without limitation changes to account for movement into a new time zone, seasonal time change protocols such as daylight savings time, or the like. Local clock 432 may be periodically synchronized to a global clock reference via in non-limiting example network time protocol (NTP), a trusted timestamping procedure with one or more third party clocks, or other means as will be apparent to those skilled in the art upon reviewing the entirety of this disclosure.

With continued reference to FIG. 4, an element of system 400, which may include without limitation temporal attester, may generate one or more secure timestamps as a function of the current time. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that the trusted computing module, into which the listener device is integrated, or to which the listener device is communicatively coupled, is an authentic trusted computing module that has the property of attested time. In an embodiment, DAA is an anonymous digital signature scheme, which instead of reliance on a certificate authority to link a particular private key to a particular party, uses reference to a group public key or to multiple public keys to verify an anonymous signature. Secure computing module 416 may act as a "first signer" of a digital signature, signing with a private key produced from a secret generator as described above. In an embodiment secure computing module 416 signs an element of data using the private key. A second signer, which may be secure computing module 416 and/or an additional element coupled thereto, may previously or subsequently sign the element of data or another element linked to the element previously signed; alternatively or additionally, second signer may use information or signature elements provided by secure computing module 416 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

With continued reference to FIG. 4, generating the secure timestamp may include recording the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module. Additional data may include one or more additional data, including sensor data or a hash of data, that are received or generated by temporal attester 428. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). TSA may include a single device and/or a plurality of devices which may act in parallel and/or in concert; for instance, and without limitation, TSA may include a distributed TSA as described in as described in Provisional Application No. 62/758,367. The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, the temporal attester 428 is a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, verifiers may evaluate confidence levels in temporal attester 428 and/or perform threshold cryptography with a plurality of temporal attesters 404, each of which may have performed an embodiment of method 200 to produce a secure timestamp.

Still referring to FIG. 4, elements of system 400 including without limitation evaluating device 404 may verify at least a secure timestamp. Where at least a secure timestamp includes at least a digital signature, verifying the at least a secure timestamp may include evaluating the at least a digital signature, for instance by performing a verification step of a zero-knowledge proof protocol, or by decrypting the signature using a public key corresponding to a private key used to encrypt the signature. Verification may further include verification of a hash; for instance, evaluating device 404 may receive a message purported to match the hash and may hash the message to check that the resulting digest matches a hashed value received as part of at least a secure timestamp. Where at least a secure timestamp includes at least an entry on a hash chain, verifying the at least a secure timestamp further comprises evaluation the at least an entry on the hash chain.

Still viewing FIG. 4, where at least a secure timestamp includes a plurality of secure timestamps verifying may include generating a plurality of verifications, each verification of the plurality of verifications representing a verification of a distinct secure timestamp of the plurality of secure timestamps and verifying the at least a secure timestamp as a function of the plurality of verifications. This may be performed, for instance, using threshold cryptography as described above. In an embodiment, this may be combined with evaluation of multiple confidence levels in multiple temporal attesters 404; for instance, a contribution of each temporal attester to calculation against a threshold may be weighted by a confidence level determined for such temporal attester as described in further detail below. While highly infeasible, it is theoretically possible that a single device identifier in a single trusted computing module may be compromised by a malicious actor, and if such malicious actor also has sufficient knowledge of the beacon signals the compromised device should have received at a particular location in 3-space, such that a sophisticated actor may falsify the sensor data log to appear to be in a different location than is actually the case. To mitigate against single node compromises, in an embodiment, sensing device 420 and/or other device may, either alone or in conjunction with the self-attested timestamping method, send via DAA sensor data and local timestamp information to one or more verifier nodes in the network, that in turn may operate as trusted timestamp authority/authorities.

With continued reference to FIG. 4, where at least a temporal attester 428 generated the at least a secure timestamp, verifying the at least a secure timestamp may further include assigning at least a confidence level to the at least a temporal attester 428, and verifying the at least a secure timestamp as a function of the at least a confidence level. This may be performed according to any process or processes used to determine a confidence level of any device as described below.

With continued reference to FIG. 4, system 400 may include one or more verified nodes. One or more verified nodes may include one or more computing devices having a very high associated confidence level; one or more verified nodes may, for instance, include a secure computing module 416, which may contain elements performing extremely reliable device identification and authentication methods. One or more verified nodes may include and/or be implemented in any manner suitable for implementation of verified devices 128 as described above in reference to FIGS. 1-3. Secure module 416 of a verified node may produce secure proofs that are authenticated or vouched for by manufacturers, rendering provenance and possession of verified node more transparent to users and devices in system 400. Secure module may identify verified node as belonging to an institution, person, or entity having a high degree of trustworthiness regarding system 400; high degree of trustworthiness may be established by identification of entity as one subject to regulation, such as a bank, or one having a significant stake in proper functioning of system 400, such as a large amount of virtual currency within system whose value and usability depend on overall system integrity. Selection of verified nodes may be performed by one or more remote devices 412 according to any methods described below for establishment of confidence levels in a node. A verified node may also be a remote device 412. Verified nodes may be recorded or otherwise identified in a verified node register 436. Verified node register 436 may include any suitable listing of records identifying devices; verified node register may include a temporally sequential listing 204 as described above. An instance of verified node register 436 may include a sufficient link to or portion of a temporally sequential listing 204 to permit a remote device 412 including the instance to participate in one or more protocols for generating or recording digitally signed assertions 200, creating sub-listings 208, and/or authenticating digitally signed assertions 200, sub listings 208, and or temporally sequential listing 204 as describe above.

Still referring to FIG. 4, any of verified nodes and/or remote devices 412 may be configured to perform any processes or steps as described or alluded to herein, including without limitation performance of secure proofs, storage tasks, authentication tasks, or the like. Any remote device of plurality of remote devices may include a secure computing module 416, which may include without limitation any secure computing module as described above in reference to FIGS. 1-3.

Figure 5:
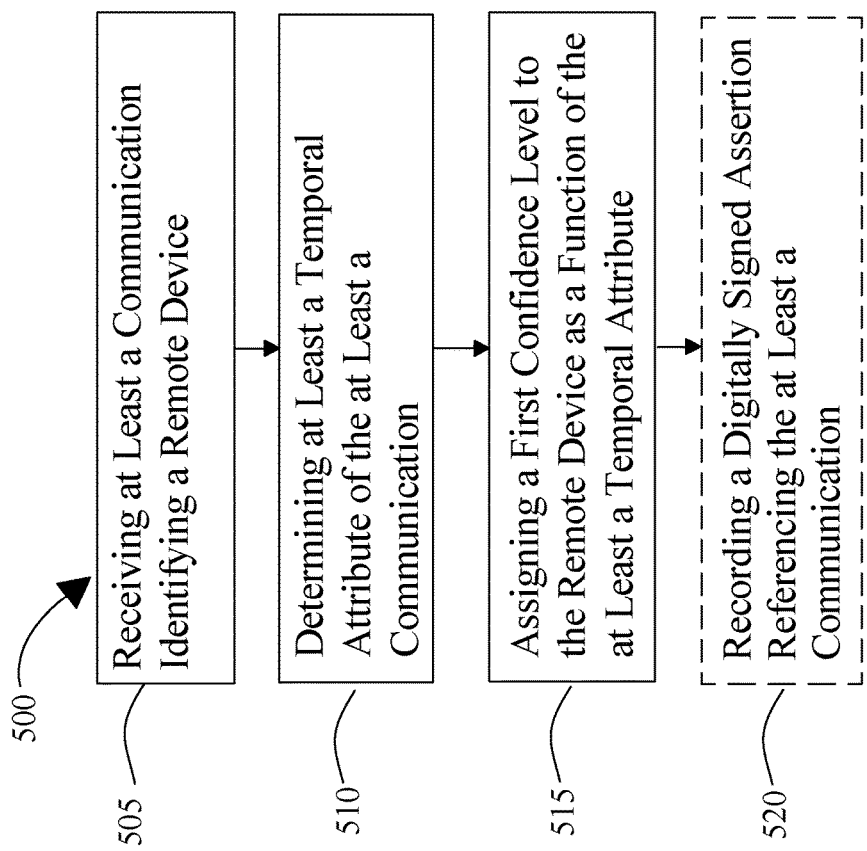
FIG. 5 illustrates particular implementations of various steps of a method of assigning a confidence level to a remote device as a function of temporal attributes.

Referring now to FIG. 5, an exemplary embodiment of a method 500 of assigning a confidence level to a remote device as a function of temporal attributes is illustrated. At step 505, processor receives at least a communication identifying a remote device. Receiving the at least a communication may be accomplished, without limitation, as described above in reference to FIG. 3. Receiving the at least a communication may include receiving the at least a communication from the remote device; at least a communication may, for instance, be received via any form of wired or wireless electronic communication. Receiving at least a communication from remote device may include receiving at least a communication directly or indirectly; for instance, remote device may relay the at least a communication via other devices connected to the network, or record it in a file, temporally sequential listing, or other register. Indirectly or directly received communications from remote device may include one or more secure proofs, verification data, and/or device fingerprint information usable to identify remote device as described in further detail below.

Continuing to refer to FIG. 5, receiving the at least a communication may include receiving an instance of a temporally sequential listing containing the at least a communication; at least a communication, or a reference thereto, may be included in a digitally signed assertion in temporally sequential listing, which may be recorded by any device in system 400. At least a communication may alternatively or additionally be included in verified device register 436, reflecting a determination by processor, a number of remote devices of plurality of remote devices 412, or the like, of a confidence level in remote device, for instance as described in further detail below. Receiving at least a communication may include receiving a communication from an additional device, which may a remote device of plurality of remote devices 412 and/or a verified device. Receiving at least a communication may include any combination of the above-referenced actions; for instance, at least a first communication may be received as part of a temporally sequential listing, at least a second communication may be received from remote device, and/or at least a third communication may be received from another device.

Still referring to FIG. 5 reception of at least a communication may include reception of a secure proof identifying remote device, where a secure proof may include, without limitation, any secure proof as described above in reference to FIGS. 1-3. Alternatively or additionally, evaluating device 404 may identify remote device by identifying a device fingerprint of remote device; this may be performed, without limitation, as described above in reference to FIGS. 1-3.

At step 510, and still referring to FIG. 5, processor determines at least a temporal attribute of the at least a communication. At least a temporal attribute of the at least a communication may include any calculation using a relative or absolute time of any communication of at least a communication; for instance, at least a temporal attribute may include the time, date, Julian date, timestamp, or the like of generation, reception, and/or recordation in any data structure of a communication of at least a communication, a degree of recency of a communication of the at least a communication, at least an interval of time between such times of generation, reception, and/or recordation of multiple communications, an average of such intervals, a frequency or other pattern of generation, reception, and/or recordation of multiple communications, or some combination thereof, as further elucidated in this description.

Continuing to refer to FIG. 5, at least a communication may include at least a secure timestamp, which may be any secure timestamp as described above in reference to FIG. 4. As used herein, at least a communication includes at least a secure timestamp where at least a secure timestamp is included in the at least a communication or in a data structure in which the at least a communication is included. For instance, where at least a communication is included in a temporally sequential listing, such as without limitation a temporally sequential listing used as or included in verified device register 436, each sub listing or "block" in temporally sequential listing may include a secure timestamp; temporally sequential listing may double as a hash chain used to record secure timestamps as described above in reference to FIG. 4. Determining at least a temporal attribute of at least a communication may include determining the at least a temporal attribute as a function of the at least a secure timestamp; this may include evaluating the at least a secure timestamp, for instance as described above in reference to FIG. 4, followed by determination of the time or times recorded in the at least a secure timestamp. Alternatively or additionally, evaluating device 404 may determine a time of generation, reception, or recordation of at least a communication using means other than a secure timestamp, including without limitation by recording a time of reception as generated by a clock connected to evaluating device 404.

With continued reference to FIG. 5, determination of at least a temporal attribute may include performance of one or more calculations using at least a determined time, such as a time determined using at least a secure timestamp. For instance, and without limitation, determining the at least a temporal attribute of at least a communication may include determining a degree of recency of the at least a communication. As a further non-limiting example, where at least a communication includes a plurality of communications, determination of at least a temporal attribute may include at least an aggregate attribute of the plurality of communications. At least an aggregate attribute may include any attribute that may be calculated or derived from a plurality of communications. At least an aggregate attribute may include a frequency of generation of communications of plurality of communications. At least an aggregate attribute may include a regularity of generation, recordation, and/or reception of communications of the plurality of communications; regularity of generation, recordation and/or reception of communication may be determined, without limitation, by calculating a standard deviation or other metric of deviation from a mean interval between temporally adjacent communications, or the like. At least a temporal attribute may include a combination of recency and the at least an aggregate attribute; for instance, a number representing regularity and/or frequency of communications may be added to, multiplied by, or otherwise mathematically combined with another number representing degree of recency of a most recent communication. Alternatively or additionally, at least a temporal attribute may be stored in a data structure having a first field for recency, a second field for an aggregate attribute, or the like.

At step 515, and still referring to FIG. 5, evaluating device 404 assigns a first confidence level to remote device as a function of the at least a temporal attribute; assigning confidence level may include, without limitation, determination of confidence level. Determination of confidence level may include determination of confidence level according to one or more factors in addition to at least a temporal attribute. For instance, evaluating device 404 may determine a confidence level in an identity of the remote device; assigning the at least a confidence level may include assigning the at least a confidence level as a function of the at least a confidence level in the identity. Confidence level in identity may be computed, without limitation, as described above in reference to FIGS. 1-3.

With continued reference to FIG. 5, at least a confidence level may include a single confidence level assigned to a single remote device, a plurality of confidence levels assigned to a plurality of remote devices, an aggregate confidence level of a plurality of remote devices, or any other single or plural confidence level as described herein. Assigning a confidence level may include evaluating at least a digitally signed assertion signed by remote device and assigning a confidence level to the remote device as a function of the evaluation of the at least a digitally signed assertion; this may be implemented, without limitation, as described above in reference to FIGS. 1-3.

Still referring to FIG. 5, assigning the at least a confidence level may include receiving a consensus evaluation of the at least a confidence level from a network of remote devices; this may be implemented without limitation as described above in reference to FIGS. 1-3.

With continued reference to FIG. 5, determining the first confidence level may be accomplished as a function of at least a second confidence level, which may be received in at least a communication, or by reference to a temporally sequential listing, verified device register, or other data structure; at least a second confidence level may include a confidence level in remote device. For instance, assigning the at least a confidence level may include evaluating a digitally signed assertion assigning a recorded confidence level to a remote device of the remote device, and assigning the confidence level as a function of the recorded confidence level. Digitally signed assertion may be any digitally signed assertion as described herein. Digitally signed assertion may be included in any temporally sequential listing as described herein; temporally sequential listing may include a temporally sequential listing relating identifiers of remote devices to confidence levels, where identifiers may be any data usable as identifiers as described herein. Assignment of confidence level may be performed as a function of identifier; that is, identifier may be linked to an identity of a remote device, which may be used for assignment of confidence level as described in this disclosure. Evaluating device 404 may receive an instance of temporally sequential listing and/or verified device register 436; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, evaluating device 404, and/or a network of remote devices having a confidence level in excess of a threshold, may have previously evaluated a confidence level in remote device; in an embodiment, such a confidence level may itself be recorded in an assertion listed in temporally sequential listing 204. A plurality of such assertions may be listed; as such, evaluating device 404 may determine confidence level in remote device by retrieving confidence levels so recorded. Evaluating device 404 may combine such confidence levels with confidence level determinations made by other means. Combination may be performed, e.g., by retrieving such confidence levels from temporally sequential listing 204 for remote device and aggregating confidence levels. Establishment of an aggregate confidence level in a plurality of remote devices 412 or other devices having a plurality of associated confidence levels may involve, e.g., adding together confidence levels; alternatively, aggregate confidence level may be computed by viewing each confidence level as a probability, calculating an aggregate probability by averaging or other statistical combination processes. Alternatively or additionally, a machine-learning algorithm may analyze past transactions to determine an optimal mathematical operation for calculating an aggregate confidence level. A desired confidence level to be used as a threshold may be computed in turn by reference to a user input indicating a desired confidence level, a minimal confidence level set by evaluating device 404 and/or network, for instance to ensure some degree of overall network integrity, a calculation based on a value of a transaction recorded in at least a digitally signed assertion 416, or the like.

Still referring to FIG. 5, evaluating device 404 assigns first confidence level as a function of the at least a temporal attribute. In an embodiment, evaluating device 404 may determine and/or retrieve first confidence level as described above, and then weight or modify first confidence level according to at least a temporal attribute. For instance, and without limitation, confidence level may be weighted according to how recently remote device signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level.

Alternatively or additionally, and still viewing FIG. 5, assigning first confidence level may include comparing the at least a temporal attribute to a threshold and assigning the first confidence level to the remote device as a function of the comparison. For instance, and without limitation, evaluating device 404 may have recorded in memory 408 a maximal time interval from the present within which the latest communication must have been generated, received, and/or recorded. Similarly, evaluating device 404 may have recorded in memory 408 a threshold degree of frequency, or a minimal period of periodic communication, which frequency according to any determination thereof as described above is required to meet, and/or a threshold representing a maximal degree of deviation from an average interval, or other measure of regularity. Failing to meet a threshold in a positive or negative direction may have any of various effects on confidence level. For instance, confidence level may be set to zero, drastically reduced, or reduced to a level that prevents remote device from being treated as a verified or highly trusted device, where the latest communication was not generated, received, and/or recorded within that maximal time interval.

With continued reference to FIG. 5, threshold may be calculated, adjusted, and/or selected from a plurality of potential thresholds, by evaluating device 404; this may be done as a function of any attribute or attributes of at least a communication and/or remote device. For instance, and without limitation, evaluating device 404 may identify a communication type, of a plurality of communication types, of the at least a communication, and determine the threshold as a function of the communication type; plurality of communication types may be differentiated, as a non-limiting example, according to a category of identification of remote device in at least a communication. For instance, a first category may include device fingerprint information, a second may include a digital signature issued by a certificate authority, a third may include a digital signature or other secure proof produced using a secure computing module that does not include a PUF, and a fourth may include a digital signature or other secure proof produced using a secure computing module that includes a PUF; evaluating device 404 may, as a non-limiting example, set a threshold requiring communications that are much more recent, frequent, or both, for a remote device identified only by device fingerprinting than for a remote device identified using a highly reliable method of identification, such as a PUF. This may be used, in a non-limiting example, to impose "re-attestation" frequency or recency requirements on verified devices entered in verified device register 436, as discussed in further detail below.

At optional step 520, and still referring to FIG. 5, processor may record a digitally signed assertion referencing the at least a communication. Digitally signed assertion may include any digitally signed assertion 200 as described above. Recording digitally signed assertion 200 may include recording digitally signed assertion 200 in any temporally sequential listing 204 and/or sub listing 208 as described above. Recording digitally signed assertion 200 may include recording digitally signed assertion in verified device register 436 as described above. Digitally signed assertion 200 may include first confidence level; for instance, digitally signed assertion 200 may enable a device, including without limitation evaluating device 404, to determine a second confidence level in remote device using first confidence level upon repeating some or all of method 500 one or more times. Digitally signed assertion 200 may include a secure timestamp, which may indicate a time first confidence level was determined, a time remote device was identified, a time digitally signed assertion 200 was generated, or the like. Evaluating device 404 may generate secure timestamp or may direct temporal attester 428 to generate secure timestamp. In an embodiment, where digitally signed assertion 200 is recorded in verified device register 436, digitally signed assertion may be so recorded only if confidence level and/or at least a temporal attribute meets or exceeds a threshold value; in an embodiment, requiring confidence level to exceed a threshold value for recordation in verified device register 436 may impose both temporal and non-temporal confidence requirements on remote devices recorded in verified device register 436, ensuring that such remote devices may be treated as highly trustworthy.

In an embodiment, and still viewing FIG. 5, assignment of confidence levels based on at least a temporal attribute, and/or recordation of a digitally signed assertion based on the at least a temporal attribute and/or on the first confidence level may provide a mechanism to impose "re-attestation" requirements on verified nodes, where "re-attestation" is any transaction whereby a verified node is identified, and determined via confidence level assignment to continue to qualify as a verified node. In an embodiment, system 400 may set a temporal attribute requirement for re-attestation to require of verified devices a minimal frequency of re-attestations necessary to ensure a requisite degree of security of verified devices; re-attesting only as frequently as necessary may minimize network costs in system 400. Determination of necessary frequency of re-attestation may be performed probabilistically; that is, statistics may be collected or calculated to determine likelihood that a verified device operating a secure computing module 416 having a given set of attributes may be compromised in a particular period of time, and a period of re-attestation associated with an extremely low probability of compromise may be selected. For instance, and without limitation, where re-attestation at a first rate is associated with nearly as low a probability of compromise as re-attestation at a second rate, and the second rate is twice as frequent as the first rate, the first rate may be selected as providing the same degree of safety at a much lower cost to the system 400 in computing power; a maximal acceptable probability of compromise may be set as a threshold. As noted above, probability of compromise may vary according to type of communication from verified device, and thus according to a category of attestation and/or secure computing module 416 associated with verified device. In an embodiment, verified devices may be selected for system 400 using secure computing modules 416 associated with a high degree of reliability, and thus requiring fewer or less frequent re-attestations. Degree of required frequency of re-attestations may be recalculated on a regular basis using updated statistical data. A given verified device may have its re-attestation requirement further adjusted as a function of one or more parameters of performance associated with verified device; for instance, where verified device frequently interacts with other nodes or devices the confidence level of each such node or device may be determined as described above, and the frequency or recency required for re-attestation may be set according to an aggregate confidence level associated with the other nodes or devices. In an embodiment, if a verified device does not meet a re-attestation requirement, evaluating device 404 and/or another processor in system 400 may record a digitally signed assertion or other entry in verified device register 436 indicating that the verified device is no longer verified; alternatively or additionally, any processor in system 400 may assign a lower confidence level or not utilize verified device as a result of the failure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
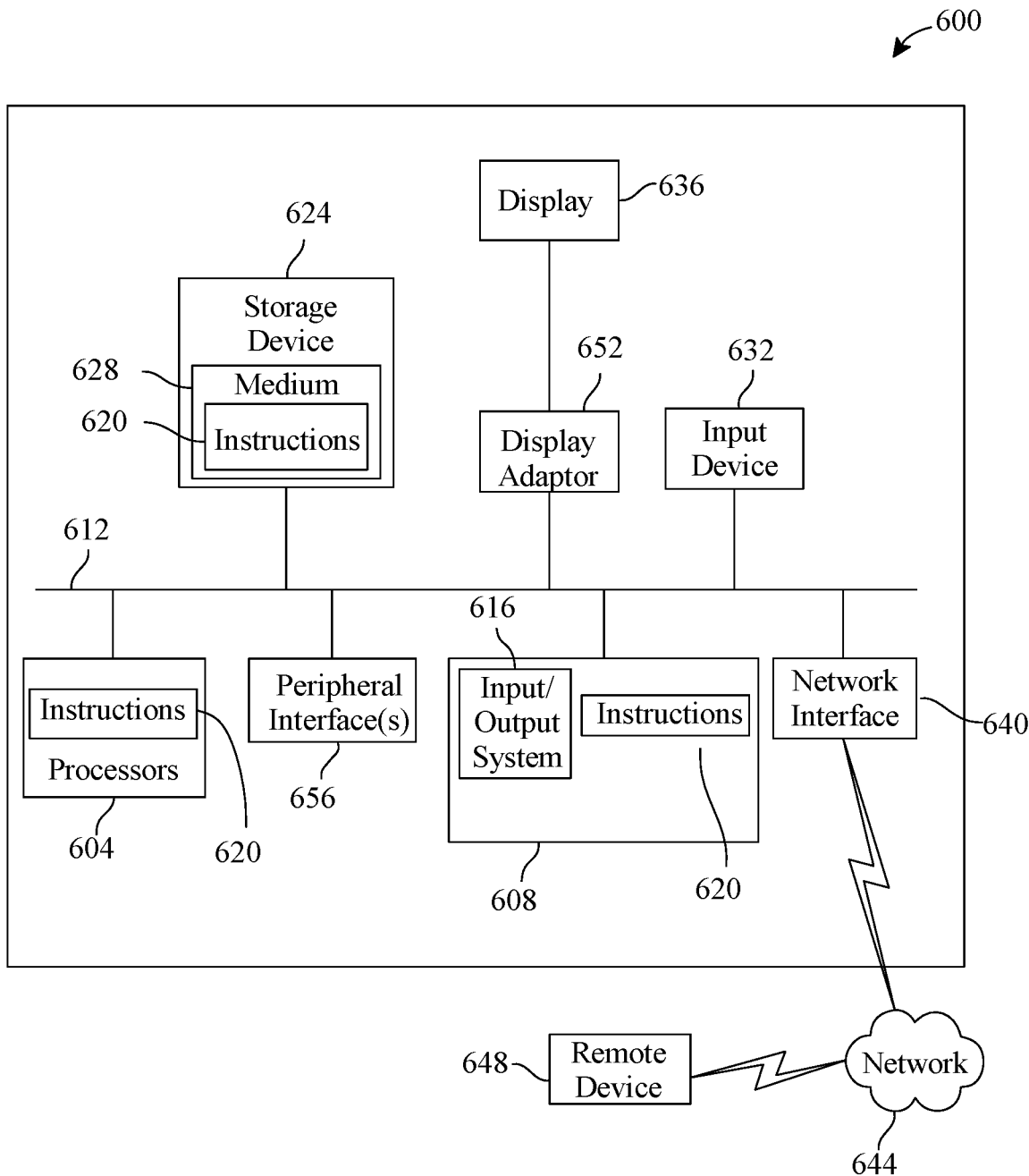
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user evaluating device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of assigning a confidence level to a remote device as a function of temporal attributes, the method comprising:
   receiving, at an evaluating device, at least a communication identifying a remote device and comprising at least a cryptographically secure timestamp;
   determining, by the evaluating device, at least a temporal attribute of the at least a communication as a function of the at least a cryptographically secure timestamp generated by a temporal attester, wherein generating the at least a cryptographically secure timestamp comprises digitally signing the at least a cryptographically secure timestamp using an anonymous digital signature scheme;
   wherein the anonymous digital signature scheme uses a direct anonymous authentication protocol including a group key signed by a first signer and a second signer; and
   assigning, by the evaluating device, a first confidence level to the remote device as a function of the at least a temporal attribute, wherein assigning the first confidence level further comprises:
   identifying a communication type, of a plurality of communication types, of the at least a communication, as a function of at least a secure proof produced by a physically unclonable function of the remote device;
   determining a temporal threshold as a function of the communication type, wherein additional circuitry demonstrates timeliness of execution of the direct anonymous authentication protocol as measured by recency of interaction;
   comparing the at least a temporal attribute to the temporal threshold; and
   assigning the first confidence level to the remote device as a function of the comparison, the assigning of the first confidence level comprising receiving a consensus evaluation of the first confidence level from a network of remote devices.

2. The method of claim 1, wherein determining the at least a temporal attribute of the at least a communication further comprises determining a degree of recency of the at least a communication.

3. The method of claim 1, wherein:
   the at least a communication further comprises a plurality of communications; and
   the at least a temporal attribute further comprises at least an aggregate attribute of the plurality of communications.

4. The method of claim 3, wherein the at least an aggregate attribute further comprises a frequency of generation of communications of the plurality of communications.

5. The method of claim 3, wherein the at least an aggregate attribute further comprises a regularity of generation of communications of the plurality of communications, wherein determining the regularity of generation of communications includes calculating a standard deviation from a mean interval between temporally adjacent communications.

6. The method of claim 3, wherein the at least a temporal attribute further comprises a combination of recency and the at least an aggregate attribute.

7. The method of claim 1, wherein:
   the at least a communication includes at least a second confidence level; and
   determining the first confidence level further comprises determining the first confidence level as a function of the at least a second confidence level.

8. The method of claim 1, wherein the cryptographically secure timestamp comprises at least a digital signature.

9. The method of claim 8, further comprising verifying the cryptographically secure timestamp by evaluating the at least a digital signature.

10. The method of claim 1, wherein the cryptographically secure timestamp comprises at least an entry on a hash chain; and the method further comprises verifying the cryptographically secure timestamp by evaluating the at least an entry on the hash chain.

11. A system for assigning a confidence level to a remote device as a function of temporal attributes, the system comprising:
    an evaluating device communicatively connected to a plurality of remote devices, the evaluating device designed and configured, including a processor, to receive at least a communication identifying a remote device and comprising at least a cryptographically secure timestamp generated by a temporal attester, wherein generating the at least a cryptographically secure timestamp comprises digitally signing the at least a cryptographically secure timestamp using an anonymous digital signature scheme, wherein the anonymous digital signature scheme uses a direct anonymous authentication protocol including a group key signed by a first signer and a second signer, and determine at least a temporal attribute of the at least a communication as a function of the at least a cryptographically secure timestamp, and assign a first confidence level to the remote device as a function of the at least a temporal attribute and the at least a communication, wherein assigning the first confidence level further comprises:
    identifying a communication type, of a plurality of communication types, of the at least a communication, as a function of at least a secure proof produced by a physically unclonable function of the remote device;

determining a temporal threshold as a function of the communication type, wherein additional circuitry demonstrates timeliness of execution of the direct anonymous authentication protocol as measured by recency of interaction;

comparing the at least a temporal attribute to the temporal threshold;

assigning the first confidence level to the remote device as a function of the comparison, the assigning of the first confidence level comprising receiving a consensus evaluation of the first confidence level from a network of remote devices.

12. The system of claim 11, wherein the evaluating device is configured to determine the at least a temporal attribute of the at least a communication by determining a degree of recency of the at least a communication.

13. The system of claim 11, wherein:
the at least a communication further comprises a plurality of communications; and
the at least a temporal attribute further comprises at least an aggregate attribute of the plurality of communications.

14. The system of claim 13, wherein the at least an aggregate attribute further comprises a frequency of generation of communications of the plurality of communications.

15. The system of claim 13, wherein the at least an aggregate attribute further comprises a regularity of generation of communications of the plurality of communications, wherein determining the regularity of generation of communications includes calculating a standard deviation from a mean interval between temporally adjacent communications.

16. The system of claim 13, wherein the at least a temporal attribute further comprises a combination of recency and the at least an aggregate attribute.

17. The system of claim 11, wherein:
the at least a communication includes at least a second confidence level; and
the evaluating device is further configured to determine the first confidence level by determining the first confidence level as a function of the at least a second confidence level.

18. The system of claim 11, wherein the cryptographically secure timestamp comprises at least a digital signature.

19. The system of claim 18, wherein the evaluating device is further configured to verify the cryptographically secure timestamp by evaluating the at least a digital signature.

20. The system of claim 11, wherein the cryptographically secure timestamp comprises at least an entry on a hash chain; and the evaluating device is further configured to verify the cryptographically secure timestamp by evaluating the at least an entry on the hash chain.

* * * * *